(12) United States Patent
Cowan, Jr.

(10) Patent No.: US 6,899,037 B1
(45) Date of Patent: May 31, 2005

(54) LINEAR MOTORS POWERED DIRECTLY BY PULSATING CURRENT

(76) Inventor: Maynard Cowan, Jr., 1107 Stagecoach SE., Albuquerque, NM (US) 87123

( * ) Notice: Subject to any disclaimer, the term of this patent is extended or adjusted under 35 U.S.C. 154(b) by 27 days.

(21) Appl. No.: 10/824,744

(22) Filed: Apr. 15, 2004

(51) Int. Cl.⁷ .............................................. B60L 13/00
(52) U.S. Cl. ...................... 104/290; 104/292; 310/12
(58) Field of Search .................. 104/290, 292, 104/294, 303, 288, 286, 24, 293, 87, 106; 310/12, 13, 14; 198/680

(56) References Cited

U.S. PATENT DOCUMENTS

| | | | |
|---|---|---|---|
| 964,498 A | | 7/1910 | Dean |
| 3,225,228 A | * | 12/1965 | Roshala ...................... 310/12 |
| 3,701,321 A | | 10/1972 | Lee |
| 3,712,240 A | | 1/1973 | Donlon et al. |
| 3,774,542 A | | 11/1973 | Walsh |
| 3,792,665 A | * | 2/1974 | Nelson ...................... 104/292 |
| 3,960,090 A | * | 6/1976 | Maki et al. .................. 104/292 |
| 4,303,870 A | * | 12/1981 | Nakamura et al. .......... 318/130 |
| 4,635,560 A | | 1/1987 | Ballantyne |
| 4,709,639 A | | 12/1987 | Geais |
| 4,931,677 A | | 6/1990 | Heidelberg et al. |
| 5,213,047 A | * | 5/1993 | Fujiwara et al. ............ 104/281 |
| 5,394,807 A | | 3/1995 | Sink |
| 5,497,038 A | | 3/1996 | Sink |
| 5,552,649 A | | 9/1996 | Cowan, Jr. et al. |
| 5,586,504 A | * | 12/1996 | He et al. ...................... 104/282 |
| 6,386,117 B1 | | 5/2002 | Cowan, Jr. |
| 6,445,092 B1 | * | 9/2002 | Marder et al. ................. 310/12 |

* cited by examiner

Primary Examiner—Frantz F. Jules
(74) Attorney, Agent, or Firm—Robert W. Harris

(57) ABSTRACT

Linear electric motors suitable for transportation of one or more vehicles along a road which may be a railroad, having electric coils as powerable motor parts and either nonferous metal plates, superconducting magnets or shorted coils as passive motor parts; employing a pulsating power source for powered motor parts, which power may be of constant or varying frequency; and having motor part spacing, and a space time relationship of motor part spacing and timing of said power source operation so as to require a minimum number of road parts per mile, and so as to provide continuous power transmission for propulsion and braking of said vehicles.

34 Claims, 16 Drawing Sheets

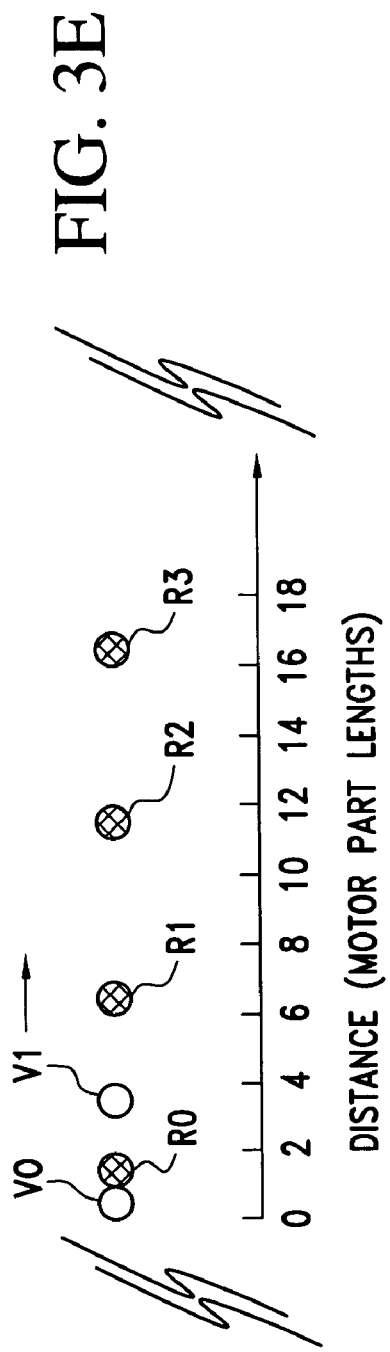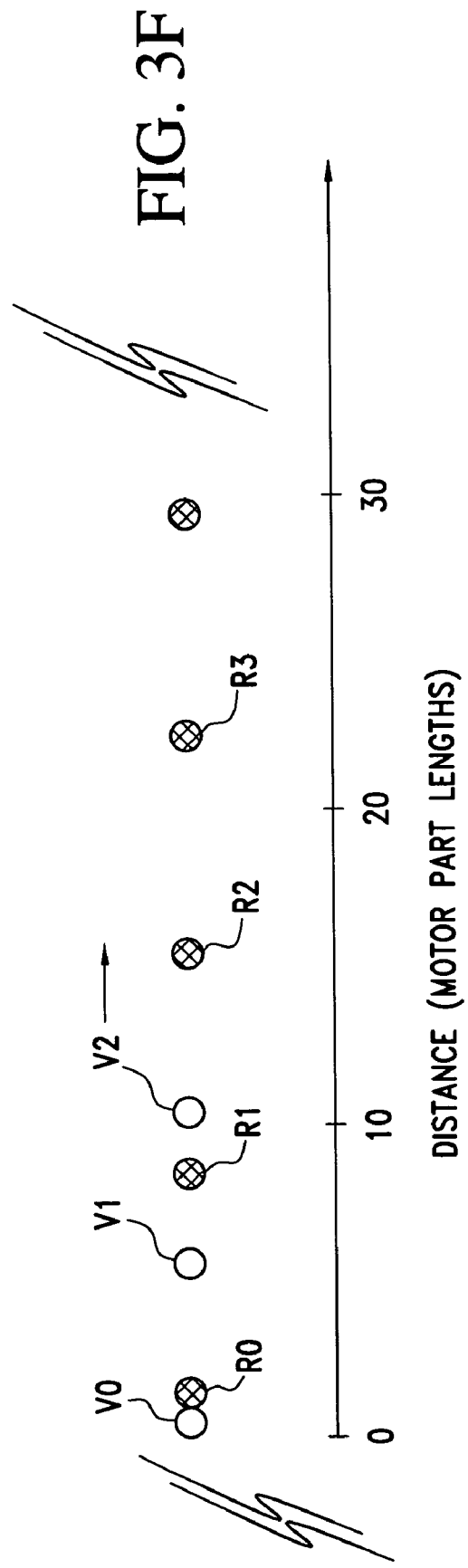
FIG. 3E
FIG. 3F

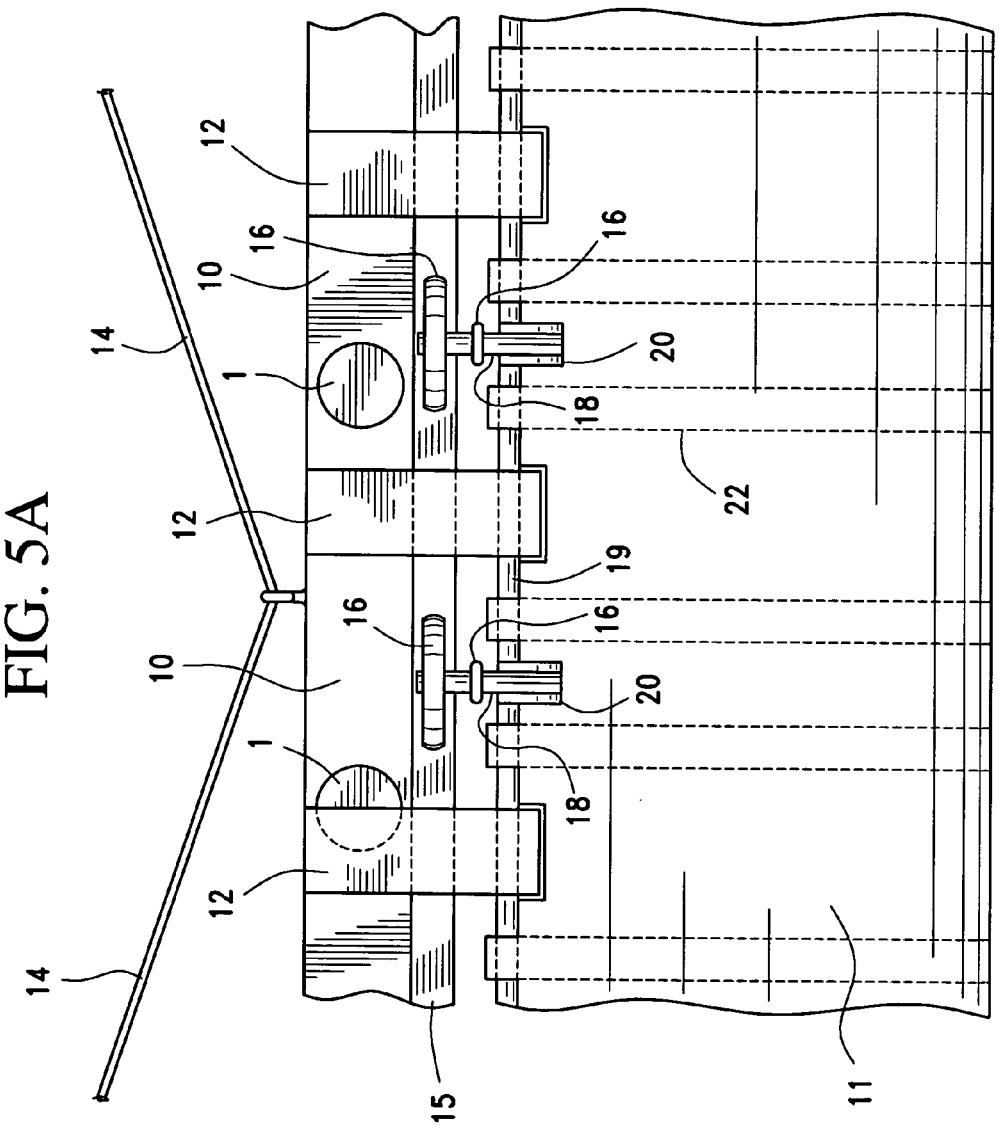

LINEAR MOTORS POWERED DIRECTLY BY PULSATING CURRENT

BACKGROUND OF THE INVENTION

The present invention pertains to linear electric motors used in powering transportation vehicles and trains of vehicles, and more particularly pertains to features allowing direct use of pulsating current to achieve planned vehicle speed and power.

Various embodiments of the present invention allow reduction of the amount of non-ferrous metal required per mile of road; reduction of required vehicle weight so as to allow better performance for a given input power, and reduction of overall system cost.

Linear electric transportation motors have motor parts on both the vehicle (vehicle parts) and the road (road parts). Electric currents in the vehicle parts and road parts interract to produce both propulsion and braking force for acceleration and deceleration of the vehicle.

Previously known linear motors include the linear induction motor, termed the LIM, the linear synchronous motor, termed the LSM, and the segmented rail phased induction motor, termed the SERAPHIM. LIM and SERAPHIM motors have vehicle parts that are directly powered, and road parts that are inductively powered. The LSM has directly powered road parts and has superconducting magnets for vehicle parts.

In order for either the LIM or SERAPHIM system to employ utility power, there must be sliding electrical contact with the power line, which may be impractical for high speed, and also considerable power conditioning equipment on the vehicle.

Although an LSM system requires no sliding contacts to use utility power, it requires expensive stationary power conditioning equipment at many sites along the road, and there are traffic restrictions between substations.

And these previously known linear motor systems require use of such large amounts of nonferrous metal, copper or aluminum, as to be cost-prohibitive for large scale operation.

All the embodiments of the present invention described below, require use of far less power conditioning equipment and substantially less nonferrous metals, than required for use of the previously known linear motor systems. Some embodiments of the present invention use motor parts similar to those of SERAPHIM, following applicant's and Barry Marder's inventions described in previous U.S. Pat. Nos. 5,552,649 and 6,445,092, the specification disclosures of which patents are hereby incorporated herein by reference in their entireties. However, the motors of the present invention are not "segmented-rail phased induction motors." Only one embodiment of the present invention uses inductively reactive parts, and they are used on the vehicle instead of in a segmented rail.

All below-described embodiments of the present invention require use of far fewer road parts per mile than in previous linear motor systems, and some allow direct use of alternating current of constant frequency for all vehicle speeds.

Another advantage of one embodiment of the present invention, is that it would allow interchangeable use of a linear motor locomotive and a conventional one, on an existing conventional railroad; whereas use of previously known linear motors would require extensive design changes in railroads and rolling stock, precluding conventional use.

Previous linear motors use a separate "rail" for motor parts in addition to a road used for vehicle suspension by wheels or by magnetic force. If one structure could serve both functions a significant cost reduction could result. One embodiment of the present invention meets this need by incorporating the road parts of the linear motor in a thin roadway with flat vertical sides, onto which the vehicle wheels are compressed, which roadway is mounted directly above an elevated vehicle, as disclosed in applicant's invention claimed in U.S. Pat. No. 6,388,117B1, the specification disclosure of which patent is incorporated herein by reference in its entirety.

It is not the intent of this application, by stating that certain embodiments of the present invention are suited to certain purposes or to dealing with certain problems, to necessarily limit the scope of the invention to only embodiments which are useful for said purposes or problems; it is instead the intent that the scope of the invention be determined by the claims as more fully stated below.

SUMMARY OF THE INVENTION

As a summary, this section of course does not explicate the invention in all the detail of the subsequent detailed description and claims. It is intended that the relative brevity of this summary shall not limit the scope of the invention, which scope is to be determined by the claims, properly construed, including all subject matter encompassed by the doctrine of equivalents as properly applied to the claims.

Although the term "road" is used herein to refer to the structure along which vehicular motion occurs, it is to be understood that the application of the invention is not limited to vehicle propulsion on any particular form of road, but could include, for example, use for both railway vehicle transportation on a road having suitably supported metal rails, and highway-type vehicle transportation on a road formed primarily of suitably supported concrete.

General Approach

To provide linear electric motors of relatively low cost yet having improved vehicle performance, the present invention uses as motor parts only powerable electric coils as road parts; but provides options for the motor parts on the vehicle: the vehicle motor parts may all be either powerable electric coils, superconducting magnets, or plates of non-ferrous metal. All motor parts, both vehicle parts and road parts, have broad, flat, parallel sides having equal lengths and substantially the same height and shape. Both vehicle parts and road parts are securely mounted, on the vehicle and road, with their broad sides parallel to the direction of vehicle motion on the road, and are so positioned that each road part has at least one of its broad sides momentarily very close to and face-to-face with at least one broad side of each vehicle part that passes it.

Pulsating electric current from a stationary source, connected to the road parts, is synchronized with vehicle motion, with power being applied briefly to each road part for the time interval that a vehicle part may usefully interact with that road part, the power being turned "on" and "off" during current nulls, hereafter called "switching nulls", that are synchronized with vehicle motion to occur at the time that the interacting motor parts have the proper relative positions. The spacing of motor parts is such that the same switching null used to turn one or more road parts "on" is simultaneously used to turn one or more other road parts "off" so that power to the motor is never interrupted. The magnetic interaction between the currents in the road part and the vehicle part exerts force on the vehicle with the option to change direction of that force at the time of any switching null so that a change between propulsion and braking may be quickly made without interrupting power.

The cost of the road is minimized by making the space between road parts as large as possible. This is done by using as many vehicle parts as is practical. However, vehicle parts that have a larger "switching distance" allow more space between road parts for a given number of vehicle parts. Switching distance is defined as the distance the vehicle moves during the time between the "on" and "off" switching nulls. For each switching distance there are motor part spacing rules that allow a constant, uninterrupted flow of power to the motor.

All three vehicle part options may operate with a switching distance of 1 motor part length (1 mpl). The spacing of motor parts for this switching distance will be called spacing option 1. Superconducting magnets and powerable electric coils may also be operated with a longer switching distance of 2.5 mpl; but this may be practical only with the former. The spacing of motor parts for this switching distance will be called spacing option 2.

When a single interaction between one vehicle part and one road part provides enough propulsion force, the road part spacing per vehicle part is greatest. However, the spacing rules also cover any number of simultaneous interactions between multiple vehicle part—road part pairs.

It may reduce the cost of the road if motor parts are sized and powered so that a single interaction between a vehicle part and a road part provides only enough thrust for most of the road's length; but, for hills or near stations where high acceleration is needed two or more simultaneous interactions are used. To accomplish this, some vehicle parts are not used until relatively high acceleration is needed and then the road parts are relatively close together.

The purposes of the present invention may also be accomplished by embodiments in which the motor's road parts are mounted directly above the vehicle, so that each powerable road coil momentarily presents both its broad sides to two broad sides of each vehicle part that passes, to achieve the most efficient use of electrical power, and to allow a locomotive powered by a linear motor of the present invention to be interchanged with a conventional one. The invention purposes may also be accomplished by mounting both the road parts and the vehicle's road directly above the vehicle and high enough for safe passage of the vehicle above all surface traffic or features.

Summary for Claims

With reference to the independent claims set forth below:

In one broad form the invention is a linear electric motor for transportation of at least one vehicle along a road, of the type having motor parts which are both vehicle parts of said motor mounted on each said vehicle, and road parts of said motor mounted along said road, comprising: a set of powerable electric coils, said set being selected from the group consisting of all of said vehicle parts, all of said road parts, and all of said motor parts; said vehicle parts, road parts and road having a configuration such that motion of said vehicle along said road sequentially brings each of said vehicle parts into close proximity with successive ones of said road parts; a spacing arrangement means, for spacing of said motor parts, to achieve the function of minimizing the number of road parts required per mile of said road; and a source of pulsating electric current, connected by synchronized switching means to power any pair of motor parts, a said pair of motor parts being one vehicle part and one road part, only while any said pair of motor parts are in position to generate an electromagnetic force upon said vehicle in a desired direction, where said desired direction is the forward direction for acceleration or reverse direction for braking.

In one broad form the invention is a linear electric motor for transportation of at least one vehicle along a road, of the type having motor parts which are both vehicle parts of said motor mounted on each said vehicle, and road parts of said motor mounted along said road, comprising: a pulsating source of electric current, connected to said motor; a switching means, connected to said motor and to said source of electric current, for switching said current on to those said motor parts that are powerable electric coils at suitable times and for suitable intervals; and a spacing and timing control means, for spacing of said motor parts and for controlling timing of said switching of said current to said motor, to perform the functions of allowing continuous transmission of power to said motor for both propulsion and braking of said vehicle, and minimizing the number of road parts required to be present along said road.

BRIEF DESCRIPTION OF THE DRAWINGS

FIGS. 3e and 3f show two examples of motor part spacing for the same vehicle and motor part lengths when spacing option 2 is used.

FIGS. 5a through 5d show how stationary road parts are incorporated into the road that is used by the wheels of a vehicle.

DETAILED DESCRIPTION

Those familiar with the art will understand that the invention may be employed in a wide variety of embodiments, for varied purposes, without departing from the essential substance thereof. The description of any one embodiment given below is intended to illustrate an example rather than to limit the invention. This section is not intended to indicate that any one embodiment is necessarily preferred over any other one for all purposes, or to in any way limit the scope of the invention, which scope is intended to be determined by the claims, properly construed, including all subject matter encompassed by the doctrine of equivalents as properly applied to the claims.

Figure 1A:
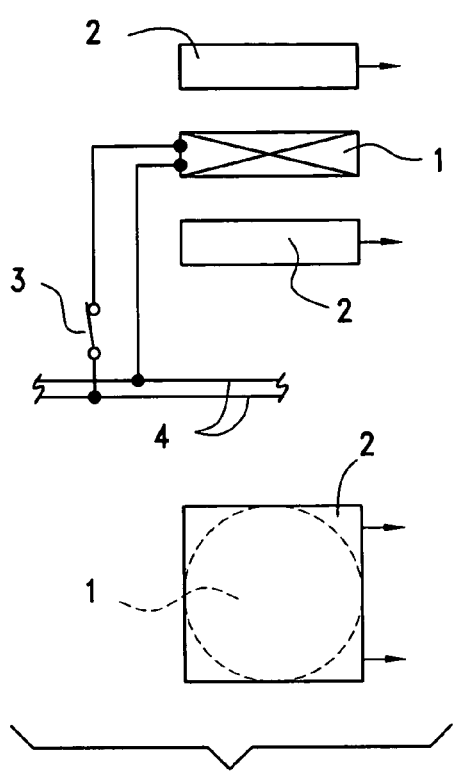
FIGS. 1a through 1h show positions in plan and elevational views for each of three vehicle part options relative to a road coil when power is switched on and off to the road coil and when spacing of motor parts is that of spacing option 1.
Figure 1B:
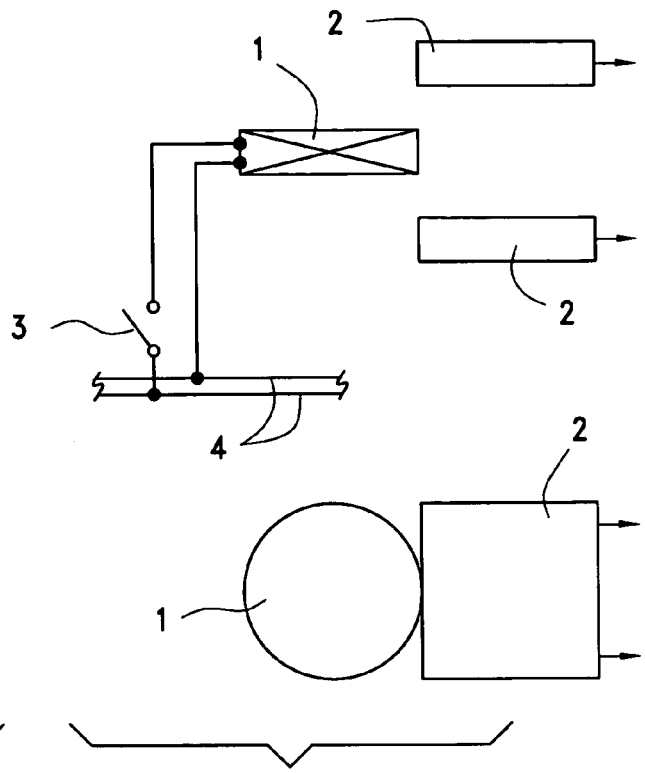
Figure 1C:
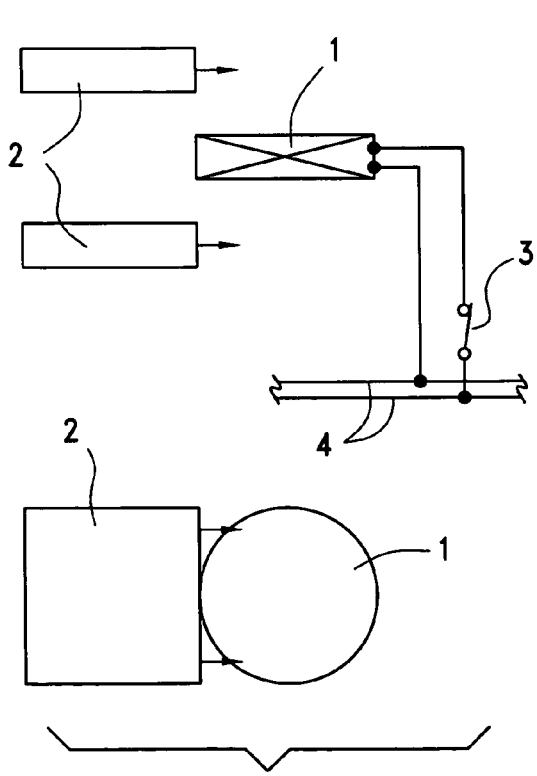
Figure 1D:
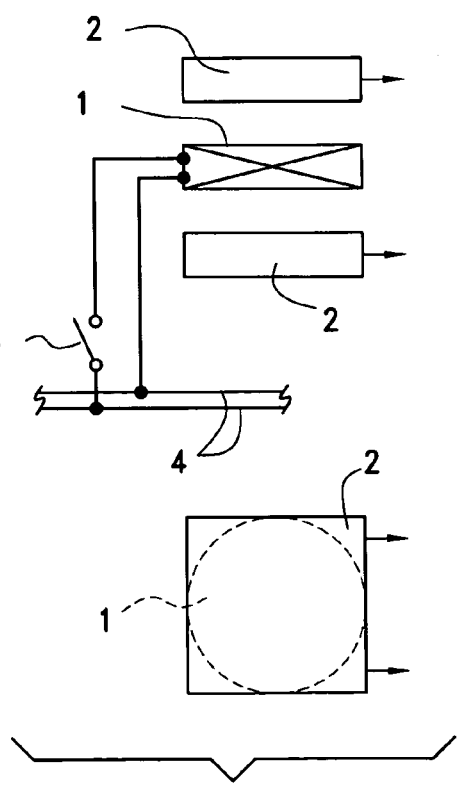
Figure 1E:
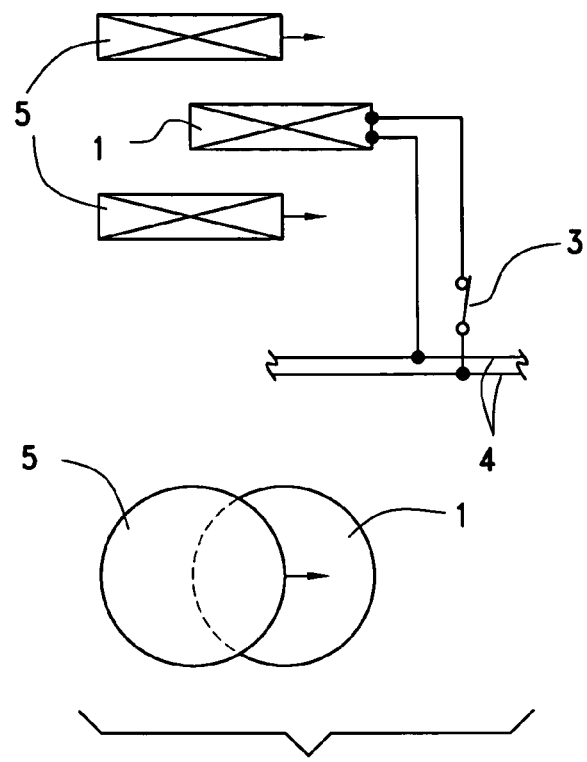
Figure 1F:
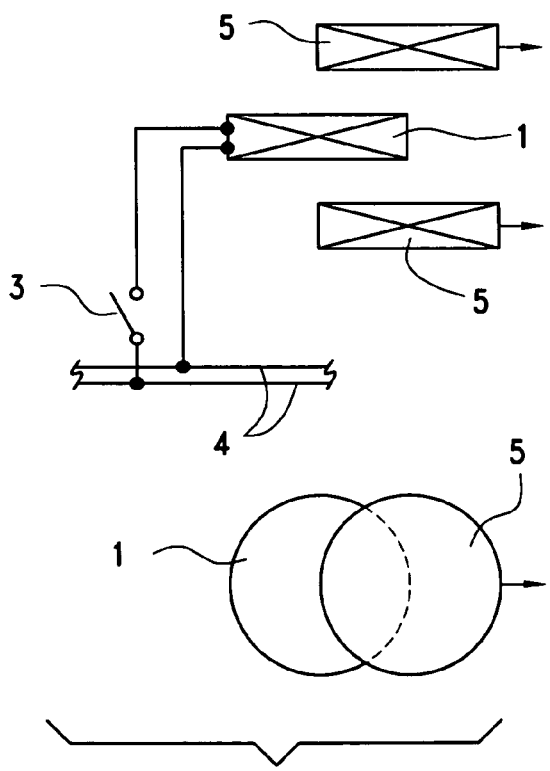
Figure 1G:
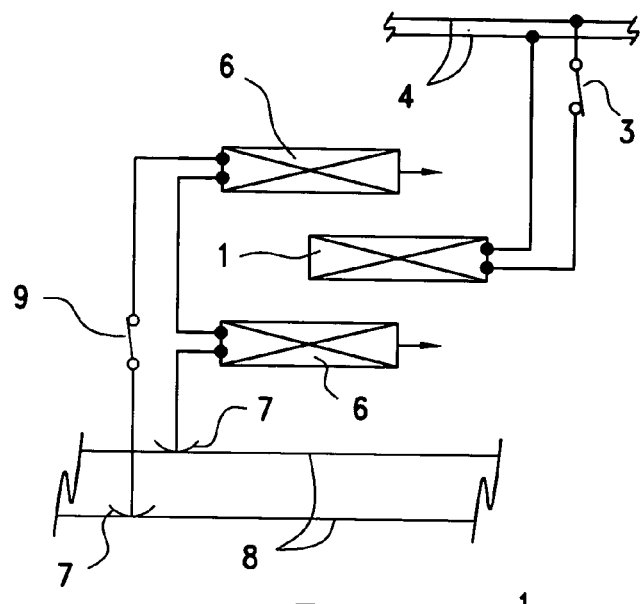
Figure 1H:
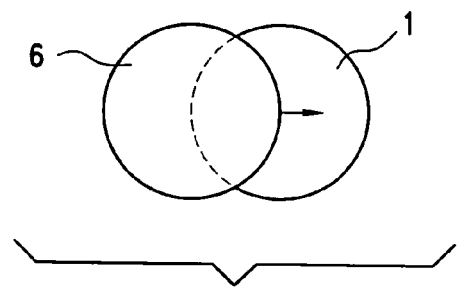
Figure 1H:
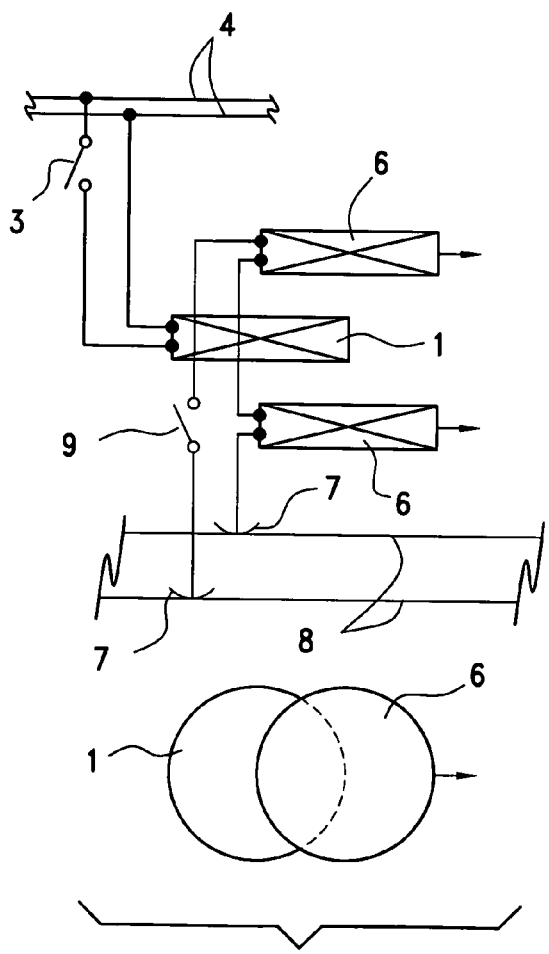

Referring now to the drawings, in which like reference numbers denote like or corresponding elements, FIGS. 1a–1h show plan and side views of road and vehicle motor parts as follows: a road coil 1 with each of the following possible vehicle motor parts: plates 2, shown in FIGS. 1a through 1d; superconducting magnets 5, shown in FIGS. 1e and 1f; and powerable coils 6, shown in FIGS. 1g and 1h. A control means (not shown) operates the normally open power switch 3 to turn power on at the time that the vehicle part has the position relative to road coil 1 shown in FIGS. 1a, 1c, 1e and 1g; and off at the time that the vehicle part has the position relative to road coil 1 shown in FIGS. 1b, 1d, 1f and 1h. These are the "on" and "off" geometries for motor parts when spacing option 1 is used. Only for the plates 2 do the propulsion on-off positions (FIGS. 1a and 1b) differ from the braking on-off positions (FIGS. 1c and 1d).

Figure 1I:
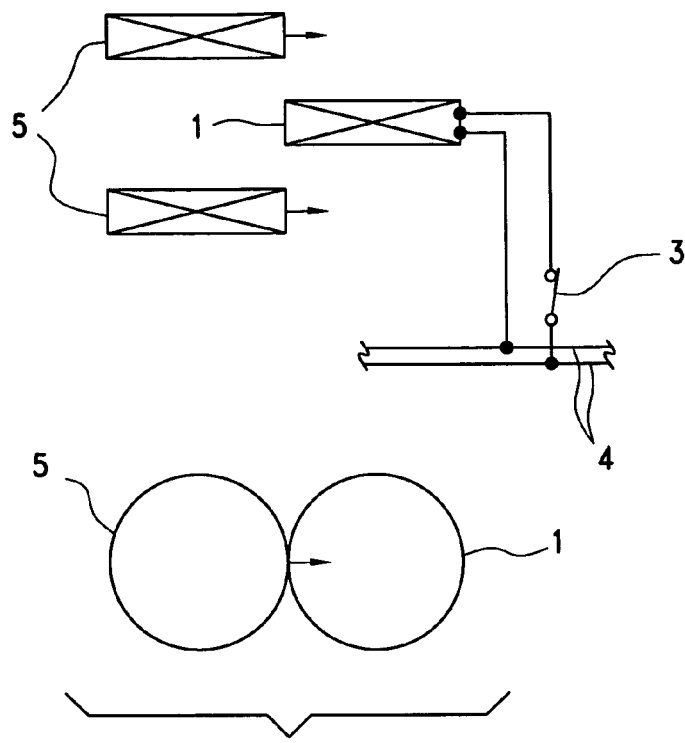
FIGS. 1i through 1l show the same on and off geometries when vehicle parts are superconducting magnets or powerable electric coils and when motor part spacing is that of spacing option 2.
Figure 1J:
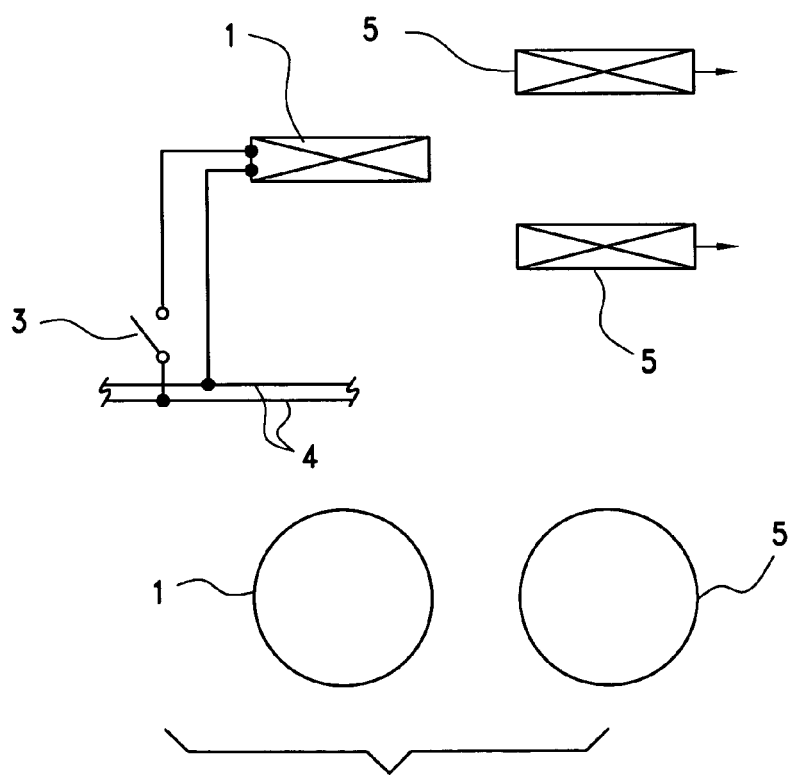
Figure 1K:
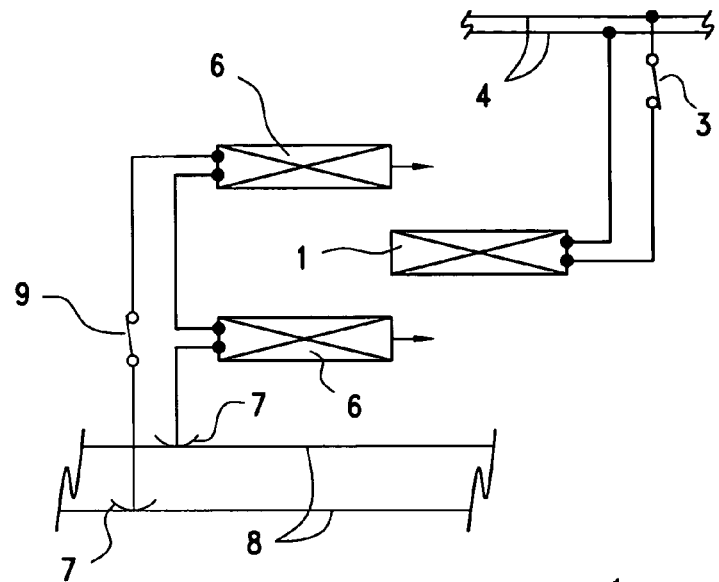
Figure 1K:
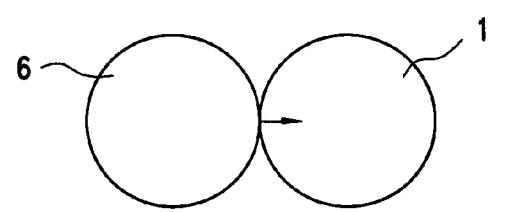
Figure 1L:
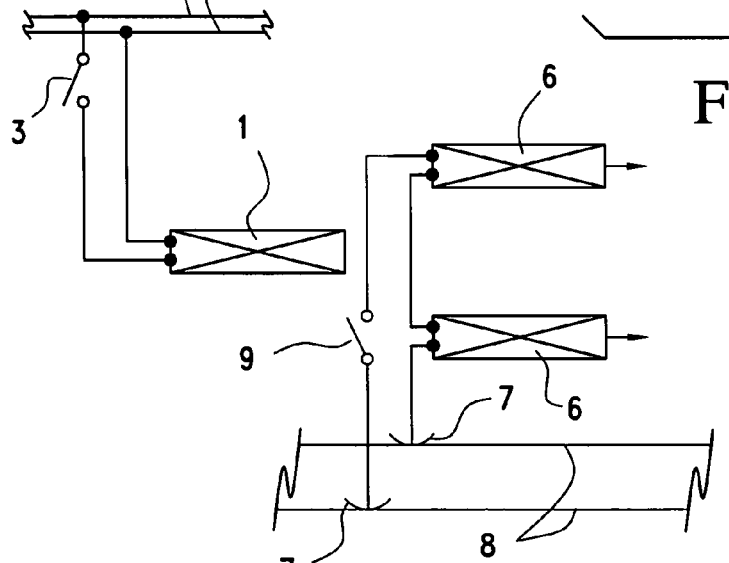
Figure 1L:
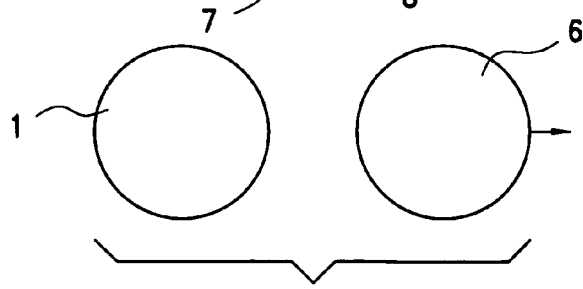

When spacing option 2 is used, only superconducting magnets 5 or powerable electric coils 6 may be used as vehicle parts. The on-off switching positions for these options are shown in FIGS. 1i and 1j and in FIGS. 1k and 1l respectively. Motor parts are shown as they would be securely mounted on the vehicle or road, without showing either the vehicle or the road. As shown in FIG. 1, vehicle parts may be pairs of either the plates 2, superconducting magnets 5, or powerable coils 6, in each case mounted face-to-face but spaced apart to straddle road coil 1 when the vehicle part passes road coil 1, with the minimum clearance that is practical for a moving vehicle.

There are two power options for the linear motor. One is pulsating current of constant frequency, an option which is practical for all three types of vehicle parts cited above. The other is variable frequency pulsating current, where the frequency is continuously adjusted to be equal to vehicle velocity divided by one motor part length. Variable frequency power is impractical when plates 2 are used as the vehicle parts.

Constant Frequency Option

To hold vehicle velocity constant or increase it, when plates 2 are used with this option, power from a substation along the road (not shown) is delivered to power line 4 where it is switched on to road coil 1 by a control means (not shown) which closes power switch 3 at the instant that current delivered by power line 4 has a null (a switching null) that is coincident with the straddling by a pair of plates 2 of a road coil 1 as shown in FIG. 1a. While power switch 3 is closed, current delivered to and flowing through road coil 1 produces induced current in plates 2, causing a repulsive force between road coil 1 and plates 2. The magnitude of this force depends upon the amplitude of the alternating current. Since road coil 1 is fixed to the road, this repulsive force propels plates 2 along with the vehicle. After the plates 2 have moved forward with the vehicle by a distance substantially equal to their length, power switch 3 is then opened at the instant that current delivered by power line 4 has a null (a switching null) that is coincident with or nearly coincident with the motor part positions shown in FIG. 1b. Simultaneously, the power switch to the next one of the road coils to be powered (not shown) is closed.

So the time between the "on" and "off" switching nulls is equal to or substantially equal to the motor part length divided by the vehicle velocity.

For this power option the frequency must be high enough to insure that, even for its highest velocity, the vehicle moves only a small fraction of a motor part length during the time between two consecutive current nulls. The reason for this requirement is to insure that loss of energy conversion efficiency is limited when the vehicle velocity is changed.

Figure 2A:
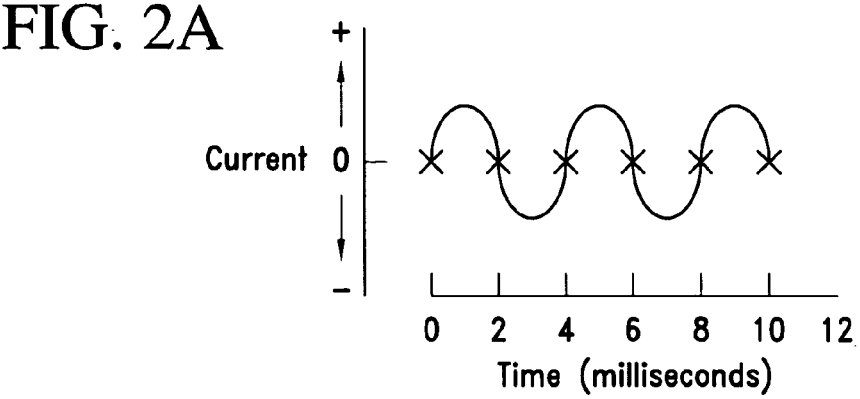
FIGS. 2a through 2h show examples of the wave forms used by road coils that operate with each of the three optional vehicle parts for both constant and variable frequency and for spacing option 1.

For example, at maximum vehicle velocity of 200 mph (91 m/sec.) and with a motor part length of 3 ft. (0.91 m) for road coil 1 and plates 2, a frequency of 250 Hz. would deliver 6 current nulls to road coil 1 during the time required for the vehicle to travel one motor part length. The form of the current vs. time for the current flowing in road coil 1, for a vehicle velocity of 200 mph, is shown in FIG. 2a for this example, with x's marking six current nulls that are spaced at 2 millisecond intervals. The nulls at 0 and 10 milliseconds are the switching nulls. The design numbers chosen allow precise synchronization between the vehicle motion at 200 mph and the current, because it requires 10 milliseconds (5 times 2 milliseconds) for the plates 2 to move their 3 ft. motor part length at that velocity.

For lower velocities more time is required between switching nulls to maintain synchronism; but, the time that power may be applied to individual road coils in this example can only be changed by increments of 2 milliseconds. Therefore, the first synchronous velocity less than 200 mph is 167 mph, the synchronous velocity for which the switching nulls must be 12 milliseconds apart. Current vs. time for 167 mph with its 7 current nulls is shown in FIG. 2b.

Figure 2B:
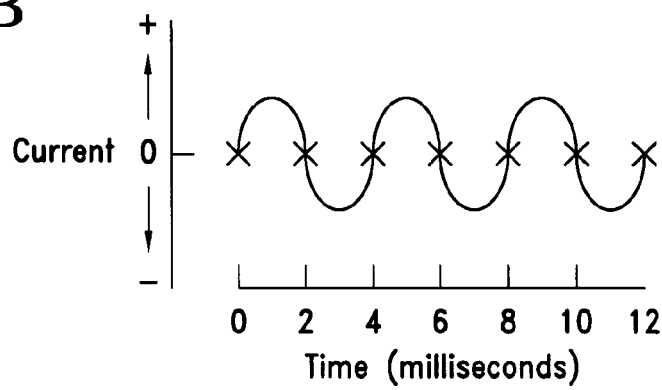

For the asynchronous velocities between 167 and 200 mph one must use either the current wave form of FIG. 2a with 10 milliseconds between switching nulls or that of FIG. 2b with 12 milliseconds between switching nulls. By using 10 milliseconds between 200 and 183 mph and 12 milliseconds between 183 and 167 mph the misalignment between motor parts at the time of a switching null never exceeds 3.5 inches between 200 and 167 mph. Since motor part length is 36 inches only a small loss of energy conversion efficiency will result.

Of course, the lower the synchronous velocities the lower will be the loss of efficiency during velocity changes, and efficiency loss may be made lower still by using different design choices (higher frequency, longer motor parts, lower maximum velocity) than those of this example.

When the motor with plates 2 is used for braking, it is operated in much the same way as for positive acceleration, except for differences in relative positions of plates 2 and road coil 1 at the instants when power switch 3 is closed and reopened, i.e. the instants of the switching nulls. For braking, power switch 3 is closed when the geometry is substantially as shown in FIG. 1c, and opened after plates 2 have moved at least substantially their full length, to the configuration shown in FIG. 1d. During the interval between closure of power switch 3 at the FIG. 1c configuration, and the opening of power switch 3 at the FIG. 1d configuration, a repulsive force between plates 2 and road coil 1 slows the vehicle. At the same instant of the FIG. 1d configuration, another power switch (not shown) is closed on another road coil (not shown), to allow current to flow and generate repulsive force between another road coil/plate pair in the same manner, to continue braking the vehicle. Switching between subsequent road coils is accomplished using the same strategy employed for producing positive vehicle acceleration.

Figure 2C:
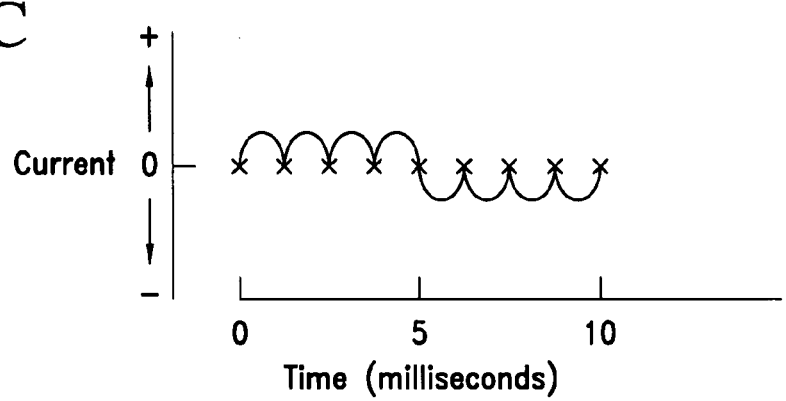

When superconducting magnets 5 are used as vehicle parts with spacing option 1 and the constant frequency power option, the configurations of the motor parts at the instants of closing and opening power switch 3 are shown in FIGS. 1e and 1f, respectively. The polarity of the pair of superconducting magnets 5 is such that the north pole of one magnet faces the south pole of the other. The polarities of all magnet pairs are parallel. Of course, two current switching nulls must occur that are at least substantially coincident with these two switching geometries, of FIGS. 1e and 1f. Again, as when one uses the plates 2 as the vehicle parts, several current nulls must occur between the two switching nulls at the highest vehicle velocity in order to control loss of mechanical power when velocity is changing. However, when power switch 3 is closed (FIG. 1e), a different form of pulsating current from that used with plates 2 is generated at a substation (not shown) along the road and delivered by power line 4 to road coil 1 while its power switch 3 remains closed. An example of a current wave form that could be delivered to road coil 1 for these vehicle part and motor part spacing options is shown in FIG. 2c. There are 9 current nulls in this example at intervals of 1.25 milliseconds marked by x's. This corresponds to a frequency of 400 Hz (a null frequency of 800 Hz). The current nulls at 0 and 10 milliseconds are the switching nulls; therefore, this wave form could only be used when the motor part length divided by vehicle velocity is equal to 10 milliseconds.

Four positive current pulses are shown in FIG. 2c starting with the switching null at 0 time, the FIG. 1e configuration, and ending 5 milliseconds later on the fifth null. The next four pulses are of negative polarity, ending at the ninth null which is also a switching null, the FIG. 1f configuration. The change of polarity at the fifth current null is done by power conditioning equipment at the substation which delivers the power to power line 4. Since the superconducting magnets 5 move at least substantially their full length, one motor part length, during the ten milliseconds between the configurations shown in FIG. 1e and FIG. 1f, when the current direction reverses at the fifth null, the superconducting magnets 5 straddle road coil 1 in face-to-face alignment. In perfect face-to-face alignment no propulsion or braking force would be generated even with heavy current in road coil 1. However, with current in road coil 1 propulsion or braking forces are generated for all other alignments between the ones shown in FIGS. 1e and 1f, depending upon the polarity of the superconducting magnets 5. If the polarity of superconducting magnets 5 is such that the pulses of positive current in FIG. 2c produce attractive forces between superconducting magnets 5 and road coil 1, then the pulses of negative current produce repulsion between them and the vehicle is propelled. By making the first four current pulses negative to produce repulsive force and the next four positive to produce attractive force, vehicle braking is achieved. The switching geometry is the same for propulsion and braking, FIGS. 1e and 1f, with superconducting magnets 5 for vehicle parts.

As with the use of plates 2 for vehicle parts, when using the superconducting magnets 5 only certain values of the vehicle velocity achieve synchronous operation with a given null frequency, so some small loss of power transmission efficiency must occur for vehicle velocity changes between these synchronous velocity values.

Figure 2D:
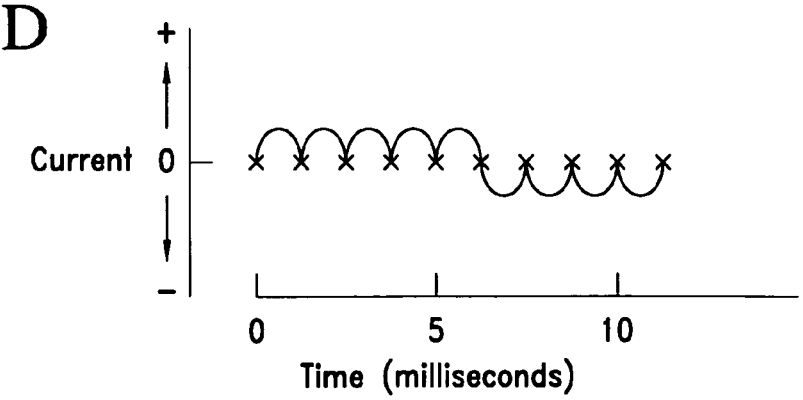

To give an example, the same maximum vehicle velocity of 200 mph and motor part length of 3 feet that were used earlier will be used again along with the current wave forms of FIGS. 2c and 2d. The current wave form of FIG. 2c is required to make 200 mph a perfectly synchronous velocity because at 200 mph the superconducting magnets 5 move through their 3 foot length in 10 milliseconds and because there is an odd number of current nulls, nine, allowing current direction to be changed halfway between the switching nulls. The velocity closest to 200 mph that is perfectly synchronous is 160 mph, which requires a current wave form with eleven current nulls. However, the higher velocity of 178 mph allows use of a current wave form shown in FIG. 2d which has ten current nulls with switching nulls 11.25 milliseconds apart and a change in current direction at 6.25 milliseconds after the "on" switching null at zero time. At least for this example, the current direction may be changed on either the sixth current null, as shown in FIG. 2d, or the fifth current null. In either case at 178 mph the superconducting magnets 5 and road coil 1 will be off perfect face-to-face alignment by only about two inches when current direction changes. No important loss of performance will result. Even as velocity is increased from 178 to 200 mph, if the change from ten to nine current nulls is made at 189 mph, no less than 94% of the length of the superconducting magnets 5 will be used to produce propulsion. Of course at lower velocity there is even less loss of thrust.

When superconducting magnets 5 are used with spacing option 2 and constant frequency, the vehicle moves two and a half motor part lengths between switching nulls as shown by comparing FIG. 1i with FIG. 1j, the power-on and power-off configurations respectively, for this pair of operational options.

A change between two synchronous vehicle velocities for spacing option 2 is made in a way very much like that which has been described for spacing option 1.

When a vehicle part is a pair of powerable coils 6, some form of sliding contact 7 such as a catenary/pantograph must be used to transmit power from power lines 8 to powerable coils 6. When powerable electric coils 6 are used with spacing option 1, motor part positions for turning power to road coil 1 on and off are shown in FIGS. 1g and 1h, respectively.

Each vehicle pair of powerable coils 6 has a normally open power switch 9 that is closed simultaneously with the closure of normally open power switch 3 of road coil 1 when the configuration of motor parts is as shown in FIG. 1g and is reopened simultaneously with power switch 3 when the configuration of motor parts is as shown in FIG. 1h. When power of constant frequency is used with this vehicle part option, nulls are used in much the same way for operating power switch 3 and power switch 9 and for limiting loss of thrust when vehicle velocity is changing as already described for superconducting magnets 5 with constant frequency. However, the current wave form required for road coil 1 can be different in this embodiment and there is a second wave form for powerable coils 6 to be considered.

Figure 2E:
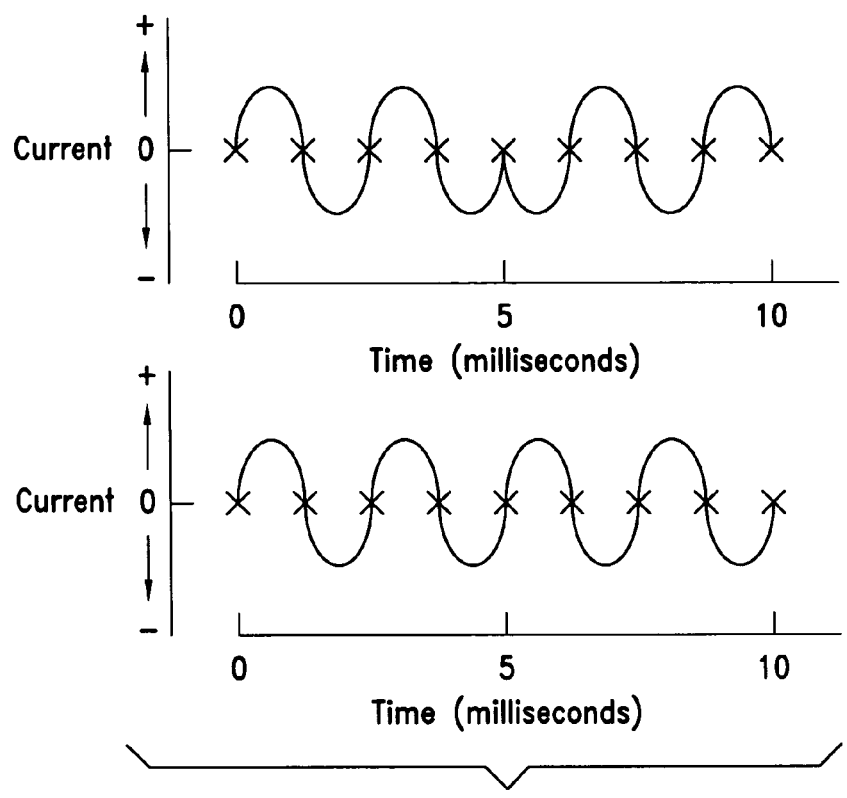
Figure 2F:
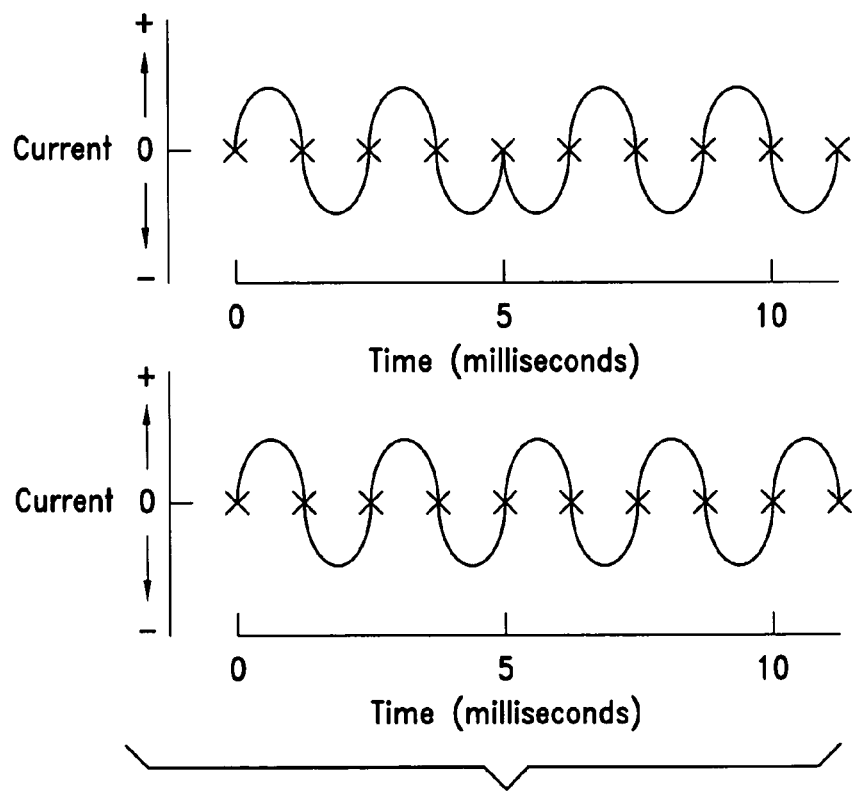

Using the same maximum vehicle velocity of 200 mph and motor part length of 3 feet, examples of current-time wave forms are shown in FIGS. 2e and 2f for sinusoidal current at 400 Hz. Two wave forms, one for road coil 1 and one for powerable coils 6 and both for the maximum velocity of 200 mph, are shown in FIG. 2e. Until 5 milliseconds after the "on" switching null at zero time the wave forms are identical. But, from 5 milliseconds to the "off" switching null at 10 milliseconds, the currents have opposite directions. If road coil 1 and powerable coils 6 are wound and mounted so that positive current in both produces an attractive force between them, a positive current in one and a negative current in the other will produce repulsion; and the wave forms of FIG. 2e are for propelling the vehicle. Then, if the two currents have opposite directions during the first five milliseconds but have the same direction from five to ten milliseconds, vehicle braking occurs. There are nine current nulls in the wave forms in FIG. 2e, making 200 mph a perfectly synchronous velocity.

As it was for the superconducting magnets 5—constant frequency example, the next lower velocity for synchronous "on" and "off" switching is 178 mph. Two wave forms for this velocity are shown in FIG. 2f where the upper curve shows an asymmetric current reversal at 5 milliseconds. When velocity is increasing from 178 mph, 5 milliseconds is the better choice; but when velocity is decreasing it would be best to change current direction at 6 milliseconds after the "on" switching null. Just as for the superconducting magnets 5, loss of energy conversion efficiency during velocity change can be small. The wave forms that do not change current direction in FIGS. 2e and 2f may be applied to either the road parts, road coil 1, or vehicle parts, powerable coils 6. There are advantages and disadvantages to either choice.

If the road coil 1 uses the wave form with unidirectional current, the bottom curves in FIGS. 2e and 2f, the need for power conditioning along the road is minimized, and there may be more than one vehicle between substations. However, then the vehicles must carry power conditioning equipment to change current direction for braking and to control power; so, the vehicles would be heavier with this choice.

If instead the unidirectional current is applied to the powerable coils 6 constituting the vehicle parts, the vehicle would be lighter and thus require less motive power, but it might be impractical to operate more than one vehicle between substations.

Powerable coils 6 may also be used with motor part spacing option 2 and constant frequency. The motor part positions for switching power on and off with powerable coils 6 and spacing option 2 are shown in FIGS. 1i and 1j, respectively.

Variable Frequency Option

Operation of the linear motor with variable frequency is not possible with plates 2; because, the relatively low frequencies of this power option would not induce enough current in the plates 2.

Superconducting magnets 5 and powerable coils 6 work with variable frequency in much the same way as they do with constant frequency. Motor part positions for switching power "on" and "off" are the same, FIGS. 1e through 1h for spacing option 1 and FIGS. 1i through 1l for spacing option 2. Also, the polarity of road coil 1 relative to superconducting magnet 5 or to powerable coil 6 must change from parallel to antiparallel each time the vehicle moves one half of a motor part length.

With the variable frequency option, switching nulls in the current wave forms delivered to the linear motor are kept perfectly synchronized with vehicle motion by changing frequency as vehicle velocity changes, so that the period T (the inverse of frequency) is always equal to the time for the vehicle to move one motor part length. Utility power is delivered to substations along the road where the frequency of its alternating current is converted to alternating or pulsating current with the proper frequency, amplitude and direction for use by the linear motor.

Figure 2G:
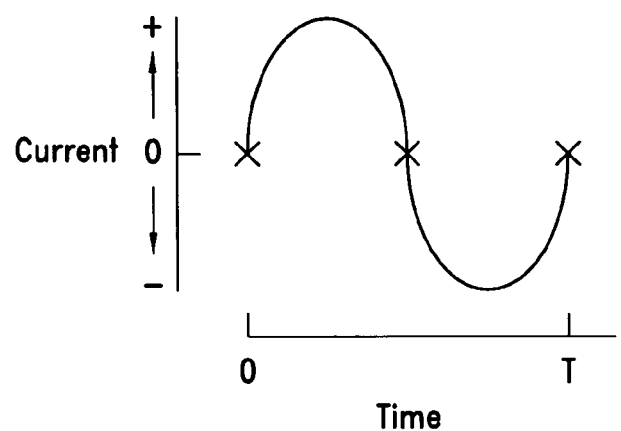
Figure 2G:
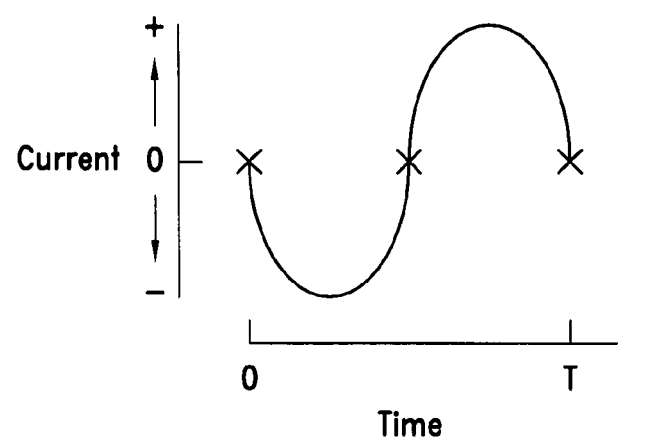

The two current wave forms required for road coil 1 when superconducting magnets 5 are used as vehicle parts along with spacing option 1, are shown in FIG. 2g; one for propulsion, and the other with current reversed for braking. Both are simply one cycle of sinusoidal alternating current with period T.

Figure 2H:
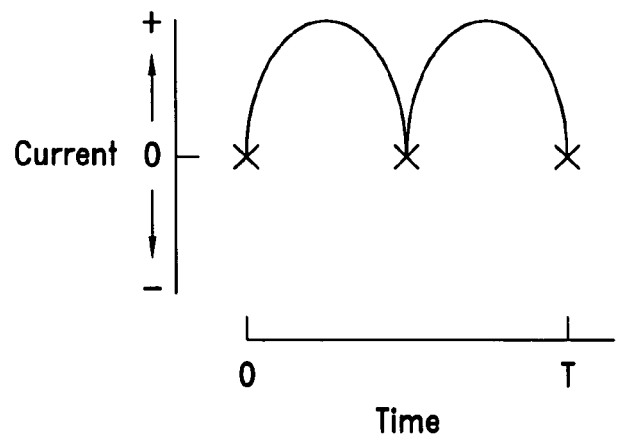
Figure 2I:
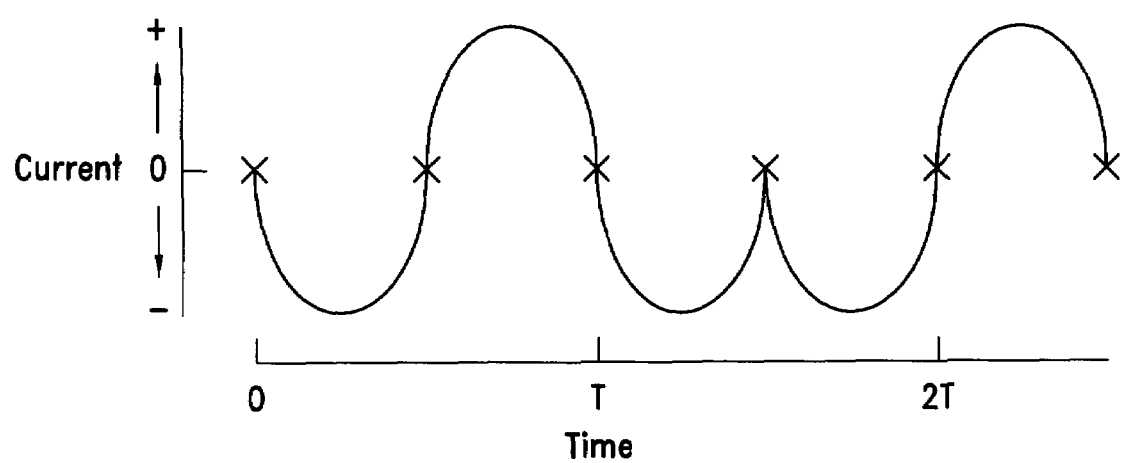
FIG. 2i shows an example of the variable frequency wave form used when superconducting magnets are vehicle parts and spacing option 2 is used.

For the case where superconducting magnets 5 are used with spacing option 2 only one wave form will be shown, that in FIG. 2i. If the wave form of FIG. 2i is appropriate for propulsion, reversing its sign at all times would be the wave form for braking. The "on" and "off" switching nulls occur at 0 and 2.5 T and the form is sinusoidal with reversal of current at 1.5 T. To make the wave form of FIG. 2i appropriate for propulsion, the polarity of all superconducting magnets 5 should be such that the negative pulse of current from 0 to 0.5 T would make the polarity of road coil 1 antiparallel to that of superconducting magnets 5.

When vehicle parts are powerable coils 6 used with spacing option 1 as in FIGS. 1g and 1h, one motor part, which may be either road coil 1 or powerable coils 6, is powered by a single cycle of alternating current with period T as shown in FIG. 2g. The other motor part is powered by a single cycle of rectified alternating current with the same period T as shown in FIG. 2h. If the coils are wound and mounted so that positive current makes the polarity of road coil 1 parallel to the polarity of powerable coils 6, then powering one of the interacting motor parts (either road coil 1 or powerable coil 6) with current as shown in the upper curve of FIG. 2g while powering the other with current as shown in FIG. 2h will produce propulsion, and using the currents of the lower curve in FIG. 2g in one part with the current of FIG. 2h in the other will produce braking.

The favored design choice is to deliver the single cycle of alternating current to powerable coils 6 from a substation (not shown) by power lines 8, sliding contact 7 and power switch 9; and to deliver the single cycle of rectified alternating current to road coil 1 from the same substation by power line 4 and power switch 3. For this design, power conditioning equipment on the vehicle controls the current direction for the single cycle of alternating current to achieve either propulsion or braking. Therefore it is practical to have more than one vehicle between substations.

For vehicle parts that are 3 feet long and are either superconducting magnets 5 or powerable coils 6, the period required for the variable frequency wave forms of FIGS. 2g and 2h is 10 milliseconds, for 100 Hz frequency, at a velocity of 200 mph and 20 milliseconds, for 50 HZ frequency at 100 mph.

Motor Part Options vs. Requirements

Each of the three options for vehicle parts has advantages and disadvantages. The plates 2 minimize the power conditioning required at substations, add the minimum weight per part to the vehicle, allow the highest magnitude pressures and are the easiest to cool. However the plates 2 have the lowest energy conversion efficiency (electrical to mechanical) and power factor (mechanical power produced/electrical power delivered).

The superconducting magnets 5 have the highest energy conversion efficiency and power factor and allow fewer road parts per mile for a given number of vehicle parts. However, the superconducting magnets 5 add the most weight per vehicle part. Also, the superconducting magnets 5 require enough electromagnetic shielding of nonferrous metal (not shown) to prevent current in the superconducting wire itself from changing too much during the interactions with road coils 1. So, the superconducting magnets 5 require high-temperature cooling for their electromagnetic shields as well as cryogenic cooling for their superconducting wire.

Powerable coils 6 offer more efficiency than plates 2; however, they require sliding contacts which may limit vehicle velocity.

Since acceleration and deceleration as high as 0.2 g are required, propulsion and braking forces up to 20% of vehicle weight must be produced by the interaction between motor parts. These forces must be generated substantially on the trailing and leading edges of the vehicle parts. Therefore, the applied magnetic pressure must be high enough to compensate for the relatively small area of the motor part edges. Still, magnetic field strengths of only a few tesla would be adequate. For example, the magnetic pressure of 2 tesla acting on an area of 1 square foot produces a force of 15 tons, enough force for a vehicle of 75 tons. Such a force might be generated by powering a single pair of passing motor parts at a time, but the present invention also allows more than one pair of passing motor parts to be powered simultaneously.

The vehicle parts will require active cooling, but passive cooling may be adequate for road coils 1.

Motor Part Spacing Options

Using spacing option 1 (switching distance=1 mpl) vehicle parts may be spaced apart by any number 1, 2, 3 . . . of mpl's. Whatever the spacing of vehicle parts, the spacing for road parts must be larger by 1 mpl. For a given vehicle part spacing, the number of vehicle parts required depends on the number of simultaneous interactions between one vehicle part and one road part that are needed to give the necessary thrust. When a single interaction suffices, vehicle parts must number 3, 4, 5, . . . when vehicle parts are spaced apart by 1, 2, 3 . . . mpl's, respectively. When 2, 3, 4 or more simultaneous interactions between one vehicle part and one road part are required, then the number of vehicle parts used when a single interaction will suffice is multiplied by a factor of 2, 3, 4 or more, respectively; but, the spacing for all motor parts is the same as for the single interaction case.

For example, if two simultaneous interactions are required and road parts are spaced apart by 3 mpl's, then 8 vehicle parts spaced apart by 2 mpl's are specified.

For spacing option 2 (switching distance=2.5 mpl) vehicle parts can be spaced apart by any even number 2, 4, 6 . . . mpl's; and, for any vehicle part spacing, road part spacing is always greater by 2 mpl's. When a single interaction between one vehicle part and one road part provides enough thrust, vehicle parts must number 2, 3, 4 . . . when vehicle parts are spaced apart by 2, 4, 6 . . . mpl's, respectively. When 2, 3, 4 or more simultaneous interactions are required, then the vehicle part numbers for the single interaction case are multiplied by a factor of 2, 3, 4 or more, respectively but the spacing for all motor parts is the same as for the single interaction case.

For example, if two simultaneous interactions are required and road parts are spaced apart by 6 mpl's, then 6 vehicle parts spaced apart by 4 mpl's are specified.

Figure 3A:
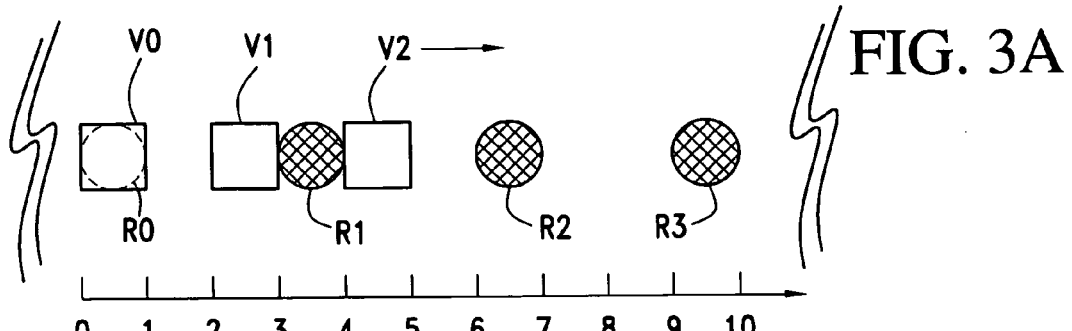
FIGS. 3a through 3d show examples of motor part spacing for vehicles of 50 foot (15.2 m) and 100 foot (30.5 m) length when motor part length is 3 feet (0.91 m) and when spacing option 1 is used.
Figure 3B:
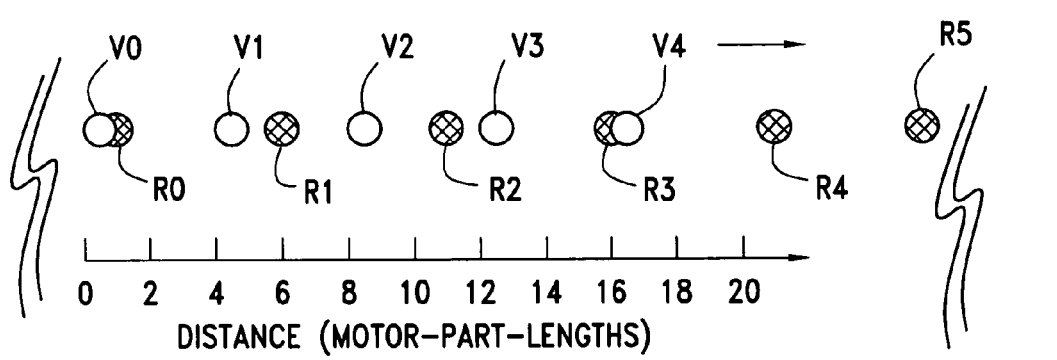

Examples of motor part arrangements for spacing option 1 when a single interaction between one vehicle part and one road coil pair 6 provides enough thrust, are shown in FIGS. 3a and 3b. In FIG. 3a the open squares V0, V1, V2 represent 3 vehicle parts each of which is a pair of plates 2 while the shaded circles R0 (covered by V0), R1, R2, R3 represent different road coils 1. Since they number only 3, vehicle parts are spaced apart by one mpl, making the space between road coils 1 be 2 mpl's. In FIG. 3b the open circles V0, V1, V2, V3, and V4 represent 5 vehicle parts that may be either superconducting magnet pairs 5 or powerable coil pairs 6; and the shaded circles R0, R1, R2, R3, R4 and R5 represent different road coils 1. The 5 vehicle parts are spaced apart by 3 mpl's, while the road parts have 4 mpl's between them.

The 2 examples of FIGS. 3a and 3b, may also be used to show how this invention allows uninterrupted power flow to the motor for spacing option 1. They show relative positions for vehicle and road parts at the instant of switching power "on" to one pair of interacting motor parts, V0/R0, and "off" on another, V2/R1 in FIG. 3a and V4/R3 in FIG. 3b, respectively. These geometries for "on" and "off" switching have been shown before in FIG. 1. It can be seen from FIG. 3a and FIG. 3b that each advance of the vehicle by 1 mpl allows "on" and "off" switching so that, for the arrangement of FIG. 3a, the power sequence is V0/R0, V1/R1, V2/R2, V0/R1 etc., while for the arrangement of FIG. 3b the sequence is V0/R0, V1/R1, V2/R2, V3/R3, V4/R4, V0/R5, etc. For any number of vehicle parts powered one at a time the powering sequence is the same, in order from the back to the front of the vehicle and with no interruption of power.

The reason that current reversal is not required when the vehicle parts are the plates 2 is illustrated in FIG. 3a. Power may be switched "on" to either motor parts V0/R0 for propulsion or V1/R1 for braking. See FIGS. 1a and 1c. For any number of plate pairs 2 on the vehicle, braking is an option that may be selected at any "on" switching time by the control means.

Figure 3C:
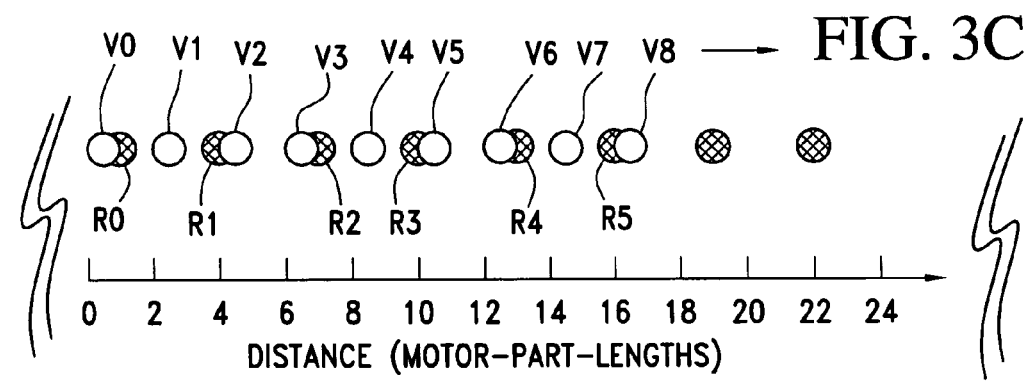

An example of an arrangement of motor parts using spacing option 1 that allows either superconducting magnet pairs 5 or powerable coil pairs 6 to interact with road coils 1 simultaneously 2 or 3 at a time is shown in FIG. 3c. In FIG. 3c 9 vehicle parts V0–V8 are shown as open circles representing either superconducting magnet pairs 5 or powerable coil pairs 6. There are three times as many vehicle parts in FIG. 3c as there are in FIG. 3a, but motor part spacing is the same. Vehicle parts V0, V3 and V6 in FIG. 3 are in position relative to road parts R0, R2 and R4 to begin a forceful interaction just as are parts V0 and R0 in FIG. 3a. Thus, the arrangement in FIG. 3c allows powering motor part interactions simultaneously 1, 2 or 3 at a time.

It may lower the cost of a road to size motor parts and apply spacing option 1 so that a single interaction between one vehicle part and one road coil 6 supplies enough thrust for most of the road's length; but, two or three simultaneous interactions are needed for a few hills or near stations.

Figure 3D:
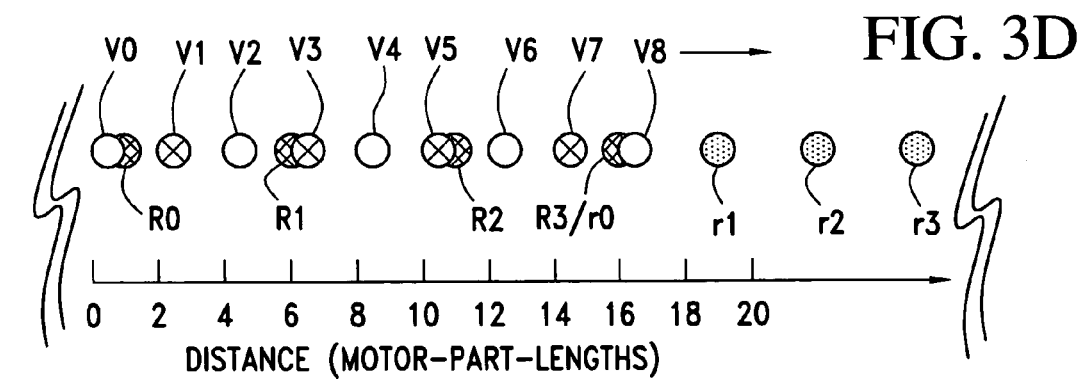

An example of how this is done is shown in FIG. 3d where the spacing of vehicle parts in FIG. 3b is combined with the spacing of vehicle parts in FIG. 3c. In FIG. 3d the five vehicle parts V0, V2, V4, V6 and V8 have the same spacing as the five vehicle parts of FIG. 3b. Therefore, when only the five even numbered vehicle parts in FIG. 3d are used, the road parts are spaced apart by 4 mpl's as they are in FIG. 3b. However, all nine of the vehicle parts V0–V8 in FIG. 3d have the same spacing as the nine vehicle parts V0–V8 in FIG. 3c. So, when all vehicle parts in FIG. 3d are used three-at-a-time simultaneously, the road parts are spaced apart by two motor part lengths as they are in FIG. 3c. By this approach where the road is relatively level or down hill road coils 1 are spaced relatively far apart, but when the vehicle must climb a hill or accelerate rapidly leaving a station, the road coils 1 are relatively close together. FIG. 3d shows the transition from the road part spacing of FIG. 3b (R0, R1, R2, R3) into that of FIG. 3c (r0, r1, r2, r3) as the vehicle moves from left to right.

Vehicle parts with odd numbers, marked with x's, are not involved in thrust production until vehicle parts start to pass road coil R3/r0. Soon thereafter and without interruption of power flow, the motor may be operated as the one of FIG. 3c, with options for powering 1, 2, or 3 road coils at a time.

Similar schemes to vary the spacing of road parts may be used when the number of vehicle parts used for one-at-a-time operation is any other odd number greater than 5:7, 9 or more. An important consequence is that peak power required from any single vehicle part—road part interaction is reduced since maximum thrust requirements are met by powering more than one vehicle part—road part interaction at a time.

Examples of motor part arrangements for spacing option 2 when interactions are powered one-at-a-time are shown in FIGS. 3e and 3f. The open circles represent vehicle parts, either superconducting magnets 5 or powerable coils 6, while the shaded ones represent road coils 1. In FIG. 3e motor part spacing is shown for the minimum number of two vehicle parts V0 and V1 with road coils 1, R0, R1, R2, R3 spaced apart by 4 mpl's. With the three vehicle parts V0, V1, V2 shown in FIG. 3f road parts are spaced apart by 6 mpl's.

Use With Conventional Rolling Stock/Railways

Figure 4A:
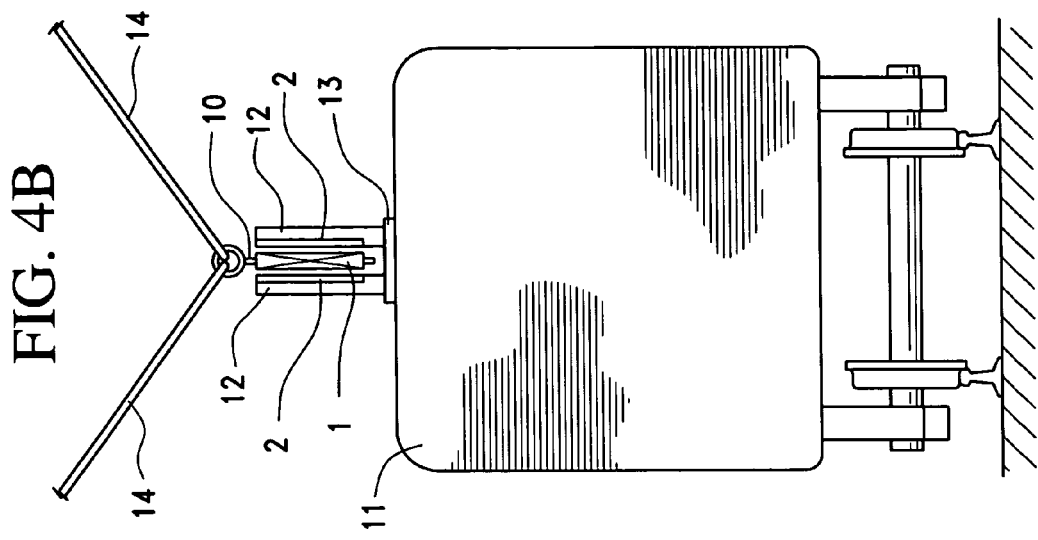
FIG. 4 shows use of a linear motor locomotive with a conventional railroad.
Figure 4B:
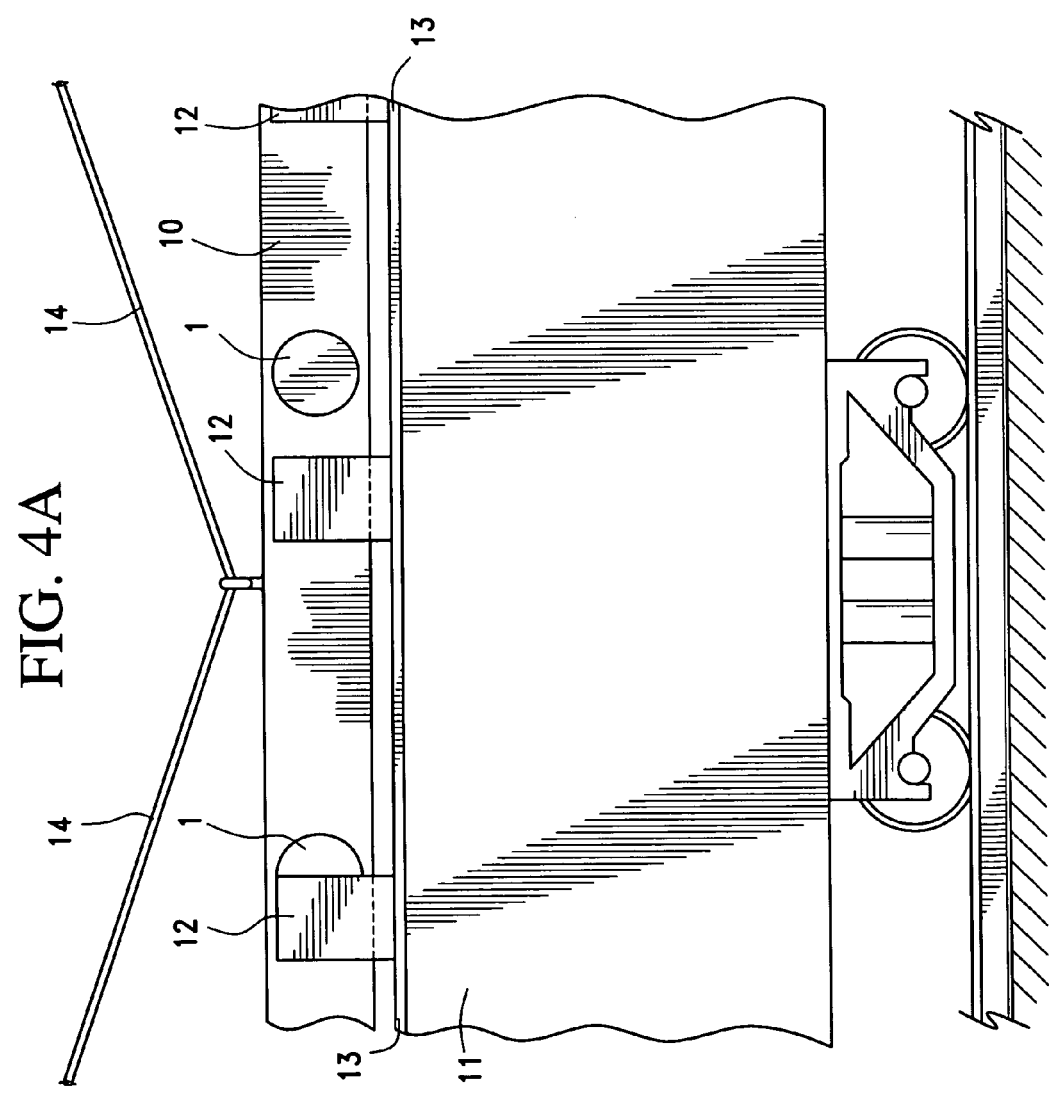

To use this invention with conventional rolling stock and railways, the road coils 1 are mounted in a ribbon-like structure 10 above the cars 11 of the train as shown in FIG. 4. The vehicle parts, for example plate pairs 2, are mounted within housings 12 on a structure 13 that is attached to the top of as many cars 11 as necessary to provide enough thrust. The cooling apparatus for plate pairs 2 (not shown) is incorporated in housings 12 and structure 13. The structure 10 housing road coils 1 is held in place by cables 14 attached to roadside towers (not shown). The normally-open power switches for road coils 1 (not shown) and vehicle part position sensors (not shown) are mounted on structure 10. Thus any passenger or freight car may become a locomotive with a relatively simple and inexpensive addition of structure 13 along its top. For a long train some of the trailing cars may also be fitted with vehicle parts to be used for braking. The structure 10 containing road coils 1 is constructed largely of steel, and its thickness may be less than that required for road coils 1; however, near road coils 1 construction must assure that eddy current losses are limited.

Figure 5C:
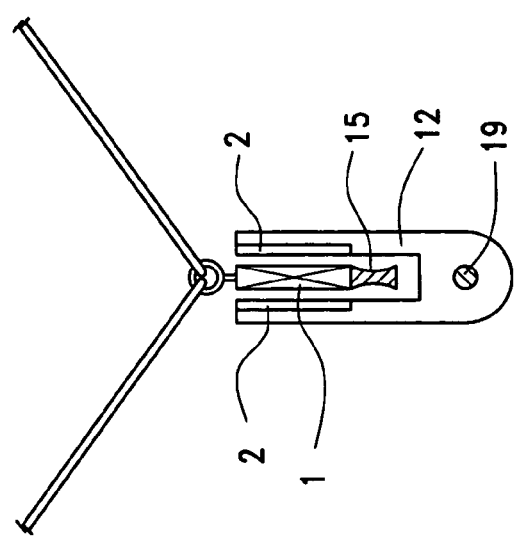
Figure 5B:
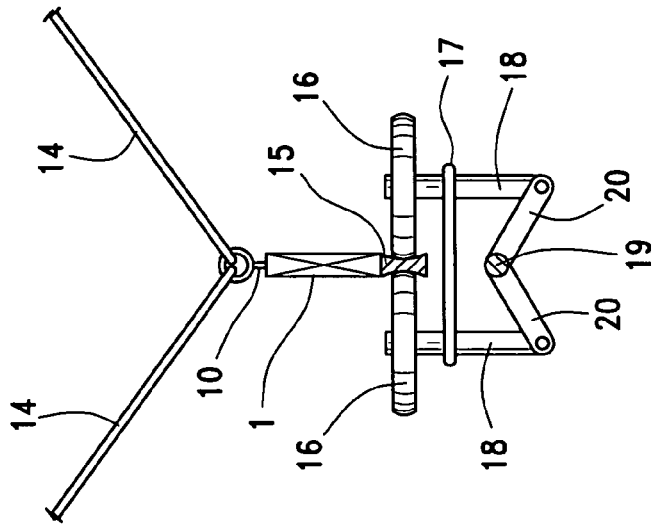
Figure 5D:
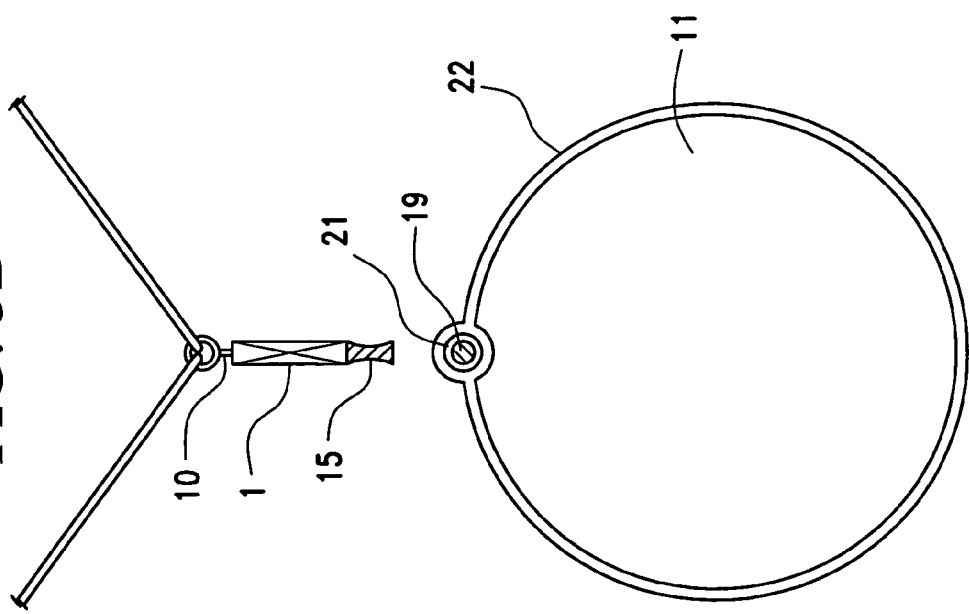

To use this invention for an elevated vehicle or train of vehicles as shown in FIG. 5 as being comprised of cars 11, the road coils 1 are mounted in a ribbon-like structure 10 which is held in place by cables 14 attached to roadside towers (not shown) and which is far enough above ground to allow cars 11 to safely pass above all surface features or traffic. A roadway 15 for the vehicle wheels 16 is attached to the bottom of structure 10 as shown in the side elevational view, FIG. 5a, and the end views, FIGS. 5b, 5c and 5d. The car 11 is attached to the roadway 15 by pairs of opposing wheels 16 that hold the 2 slightly concave sides of roadway 15 between them. Cables 17 around axles 18 urge the wheels 16 strongly against the roadway 15 as described in the specification of applicant's U.S. Pat. No. 6,388,117B1, which specification has already been incorporated herein by reference. The axles 18 for each pair of the wheels 16 are attached to a tubular beam 19 that supports the cabin of car 11 by means of a structure 20 shown in FIG. 5b. Also attached to the beam 19 are the housings 12 for plates 2 as shown in FIG. 5c. A sleeve of bearings 21 is used between the beam 19 and each structural rib 22 of the vehicle cabin, as shown in FIG. 5d, to allow the cabins of cars 11 to tilt on curves for passenger comfort. The axles 18 and housings 12 do not tilt with the cabin of car 11.

Figure 6A:
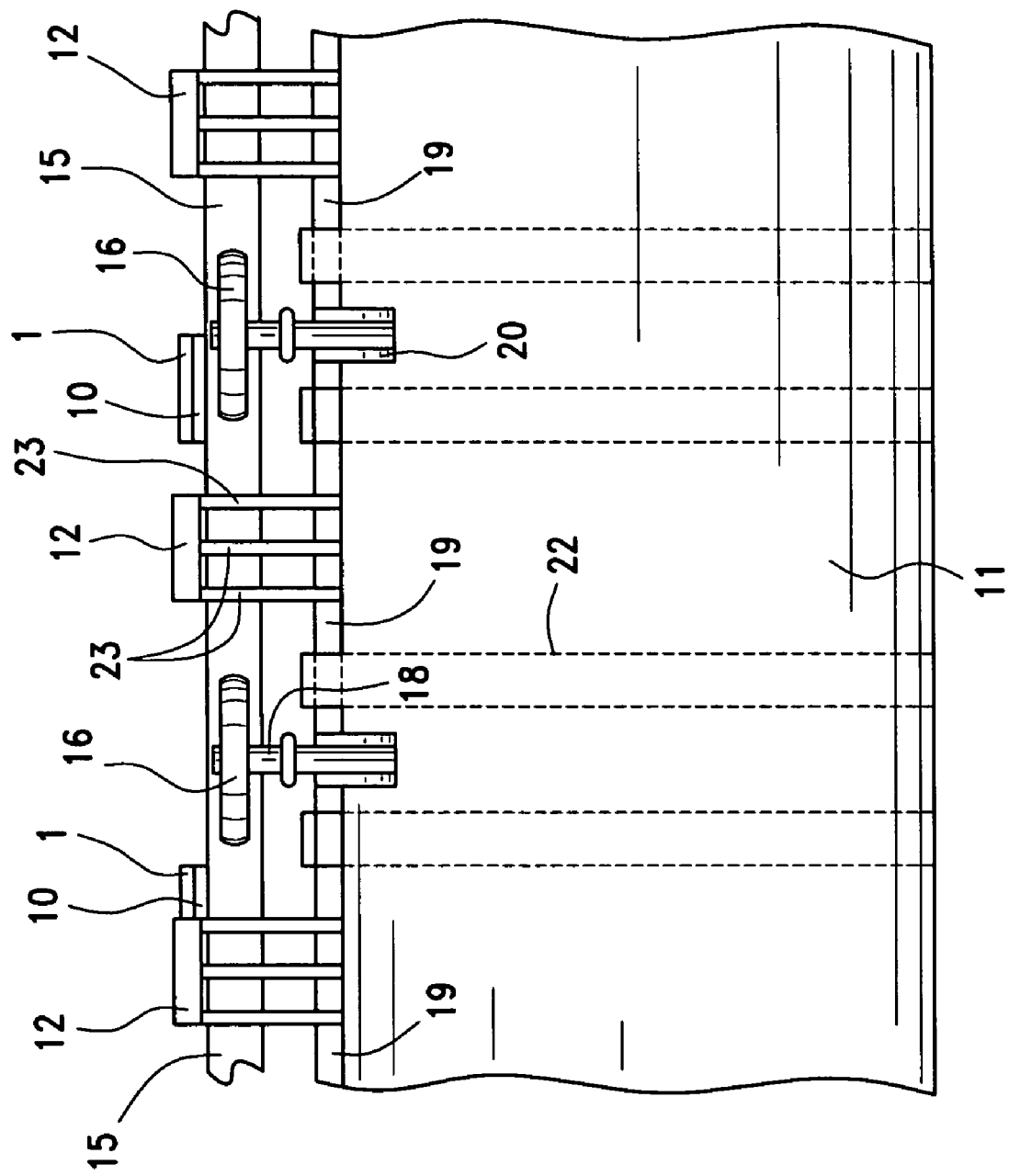
FIGS. 6a through 6c show use of an embodiment of the invention with a roadway above the vehicle.
Figure 6C:
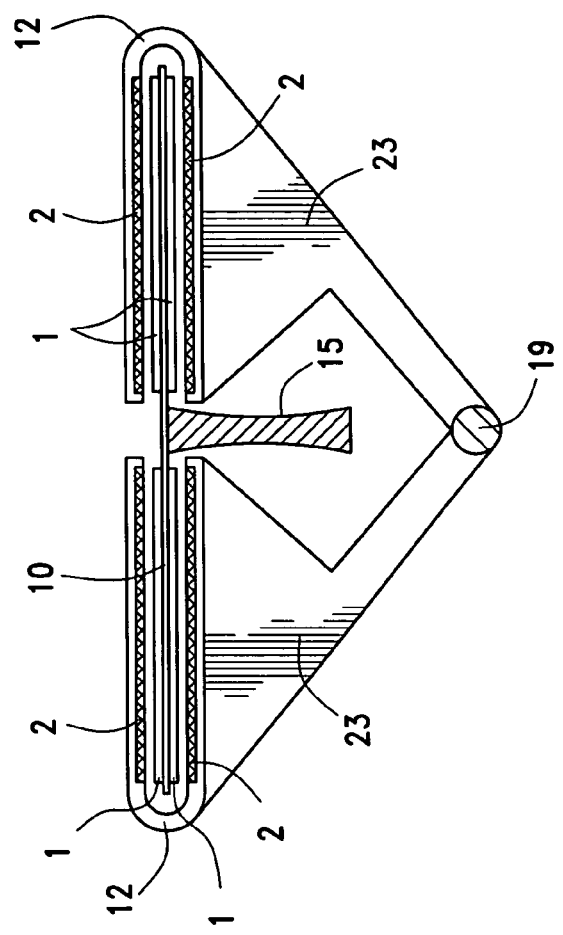
Figure 6B:
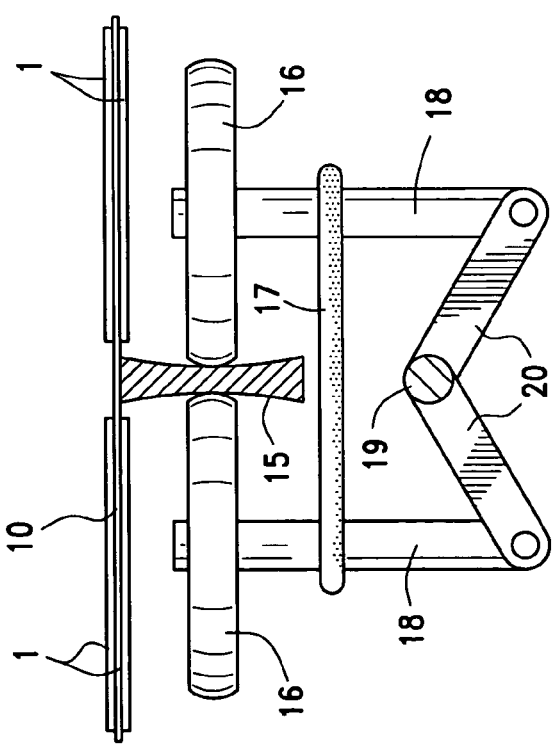

In FIG. 6 the road coils 1 are mounted on structure 10, as shown in FIG. 6b. The structure 10 is mounted to the top of roadway 15, with a road coil 1 on each side of roadway 15, said road coils 1 being at the same linear distance along roadway 15. There are 2 pairs of vehicle parts, plates 2 at each vehicle part location so that plates 2 straddle road coil 1 as the vehicle moves, as in FIG. 6c. Otherwise the operation is as described in the previous paragraph.

Although various embodiments of the invention have already been described above, many others might be employed, without departing from the essential substance of the invention. For example, and not by way of limitation, when powerable coils are vehicle parts, pairs of nonferrous metal plates may be the road parts; and, then spacing option 1 along with the constant frequency power option would be used. Also, either the vehicle or road parts may be a pair of shorted coils as described in U.S. Pat. No. 6,445,092, the specification disclosure of which patent has already been incorporated herein by reference. When shorted coils are used, switching distance is ½ mpl. Then the minimum number of vehicle parts is 4, rather than 3 or 2, and the spacing rules for motor parts are different as follows: For a single interaction and the minimum 4 vehicle parts, the space between vehicle parts is ½ mpl. Spacing of vehicle parts increases by ½ mpl for each additional vehicle part; and spacing for road parts is always ½ mpl greater than spacing for vehicle parts.

In addition, it may be advantageous to use the constant frequency power option when starting vehicles from rest even if the variable frequency option is used later.

Although the invention may be employed to powering vehicles or trains of vehicles, its application is of course not limited to vehicles. For example, it could be used to power conveyor belts carrying material or people.

Although the invention may be employed to powering vehicles or trains of vehicles, its application is of course not limited to vehicles. For example, it could be used to power conveyor belts carrying material or people. Accordingly, use of the words "vehicle" and "road" in the preamble of a claim are not intended to limit the scope of the invention to preclude such other applications; rather, the scope of a claim is intended to be interpreted as covering the combination of elements set out in the body of the claim and the body of any earlier claim or claims incorporated by reference, properly construed, where the "body" of a claim denotes the portion following the word "comprising".

Those familiar with the art will understand that for the reasons already detailed above, the above-disclosed embodiments of the invention provide both means for minimizing the number of road parts required per mile of road, and also means for allowing continuous transmission of power to the motor, providing both of said means by maximizing the efficiency of interaction between force-producing motor part pairs, through the approach of providing optimal combinations of motor part spacing and timing of current pulses for powering of motor part pairs at times of optimal alignment of the vehicle parts and road parts forming force-producing pairs of motor parts.

I claim:

1. A linear electric motor for transportation of at least one vehicle along a road, of the type having motor parts which are both vehicle parts of said motor mounted on each said vehicle, and road parts of said motor mounted along said road, comprising:

a set of powerable electric coils, said set being selected from the group consisting of all of said vehicle parts, all of said road parts, and all of said motor parts;

said vehicle parts, road parts and road having a configuration such that motion of said vehicle along said road sequentially brings each of said vehicle parts into close proximity with successive ones of said road parts;

a spacing arrangement means, for spacing of said motor parts, to achieve the function of minimizing the number of road parts required per mile of said road; and a source of pulsating electric current, connected by synchronized switching means to power any pair of motor parts, a said pair of motor parts being one vehicle part and one road part, only while any said pair of motor parts are in position to generate an electromagnetic force upon said vehicle in a desired direction, where said desired direction is the forward direction for acceleration or reverse direction for braking.

2. Linear electric motor of claim 1, wherein said road parts are powerable electric coils and said vehicle parts are plates composed of nonferrous metal.

3. Linear electric motor of claim 2, wherein said source of pulsating electric current is a source of alternating current of fixed frequency, wherein said frequency is high enough to produce a plurality of current nulls during the time that said source of alternating current remains switched on to any said pair of motor parts.

4. Linear electric motor of claim 1, wherein said road parts are powerable electric coils and said vehicle parts are superconducting magnets.

5. Linear electric motor of claim 4, wherein said source of pulsating electric current is a source of rectified alternating current of fixed frequency, wherein said frequency is high enough to produce at least a plurality of current nulls during the time that said source of rectified alternating current remains switched on to any pair of motor parts and wherein a unidirectional force is generated by any said motor part pair by changing the sign of said rectified alternating current during an appropriate one of said plurality of current nulls.

6. Linear electric motor of claim 4, wherein said source of pulsating electric current is a source of alternating current of variable frequency and wherein the period of said alternating current is equal to the time required for said vehicle to move one motor part length.

7. Linear electric motor of claim 1, wherein said road parts are powerable electric coils and vehicle parts are shorted coils.

8. Linear electric motor of claim 7, wherein said source of pulsating electric current is a source of alternating current of fixed frequency, wherein said frequency is high enough to produce a plurality of current nulls during the time that said source of alternating current remains switched on to any said pair of motor parts.

9. Linear electric motor of claim 1, wherein all of said motor parts are powerable electric coils.

10. Linear electric motor of claim 9, wherein said source of pulsating electric current is a source of rectified alternating current of fixed frequency, wherein said frequency is high enough to produce at least a plurality of current nulls during the time that said source of rectified alternating current remains switched on to any pair of motor parts and wherein a unidirectional force is generated by any said motor part pair by changing the sign of said rectified alternating current during an appropriate one of said plurality of current nulls.

11. Linear electric motor of claim 9, wherein said source of pulsating electric current is a source of alternating current of variable frequency and wherein the period of said alternating current is equal to the time required for said vehicle to move one motor part length.

12. Linear electric motor of claim 1, wherein said vehicle parts are powerable electric coils and said road parts are plates composed of nonferrous metal.

13. Linear electric motor of claim 12, wherein said source of pulsating electric current is a source of alternating current of fixed frequency, wherein said frequency is high enough to produce a plurality of current nulls during the time that said source of alternating current remains switched on to any said pair of motor parts.

14. Linear electric motor of claim 1, wherein said vehicle parts are powerable electric coils and said road parts are shorted coils.

15. Linear electric motor of claim 14, wherein said source of pulsating electric current is a source of alternating current of fixed frequency, wherein said frequency is high enough to produce a plurality of current nulls during the time that said source of alternating current remains switched on to any said pair of motor parts.

16. Linear electric motor of claim 1, wherein said source of pulsating electric current comprises a station along said road where electric utility power is converted to power with correct amplitude and wave form of pulsating current, and said converted power is transmitted both by a wire transmission means to a power switch of any powerable electric coil along said road and also by a wire transmission means and a sliding contact means mounted to said vehicle, to a power switch of any powerable electric coil on said vehicle.

17. Linear electric motor of claim 1, wherein, when only one said motor part pair is powered at a time, said spacing arrangement comprises: each of said vehicle parts and each of said road parts are at least substantially of the same length, a motor part length, and said vehicle has at least 2 vehicle parts, said vehicle parts being spaced apart by a vehicle part spacing of 2 motor part lengths for 2 vehicle parts, said vehicle part spacing being increased by 2 additional motor part lengths for each additional vehicle part in excess of 2, and spacing of said road parts is greater by 2 motor part lengths than spacing of said vehicle parts.

18. Linear electric motor of claim 17 wherein said vehicle moves 2½ motor part lengths while said motor part pair generates a desired force on said vehicle.

19. Linear electric motor of claim 18, wherein said compression means comprises:
said wheels and said axles being configured in pairs on opposite sides of said road; and
an urging means, connected to each said axle of each of said pairs of axles, for urging said axles to move toward one another and toward said road, so as to compress said wheels of said pair of wheels against said opposite sides of said road.

20. Linear electric motor of claim 1, wherein, when only one of said motor part pairs is powered at a time, said spacing arrangement means comprises: each of said vehicle parts and each of said road parts are at least substantially of the same length, a motor part length, and wherein said vehicle has at least 3 vehicle parts, said vehicle parts being spaced apart by a vehicle part spacing of one motor part length for 3 vehicle parts, said vehicle part spacing being increased by 1 additional motor part length for each additional vehicle part in excess of 3, and wherein spacing of said road parts is greater by 1 motor part length than said spacing of said vehicle parts.

21. Linear electric motor of claim 20 wherein said vehicle moves 1 motor part length while said motor part pair generates a desired force on said vehicle.

22. Linear electric motor of claim 21, wherein said urging means comprises, for each of said pairs of axles, at least one cable wound in substantial tension around each of said axles, said tension being sufficient to allow said urging means to compress said wheels against said opposite sides of said road, with compression adequate to cause said compression means to allow adequate traction to be maintained between said wheels and said road, independently of said weight of said vehicle.

23. Linear electric motor of claim 1 wherein, when only one said motor part pair is powered at a time, said spacing arrangement means comprises: each of said vehicle parts and each of said road parts are at least substantially of the same length, a motor part length, and wherein there are at least 4 vehicle parts, and wherein said vehicle parts have a vehicle part spacing which is ½ of a motor part length, and wherein said vehicle part spacing is increased by ½ motor part length for each additional vehicle part in excess of 4, and wherein said road parts have a spacing which is always ½ motor part length greater than said spacing of said vehicle parts.

24. Linear electric motor of claim 23 wherein said vehicle moves ½ motor part length while said motor part pair generates a desired force on said vehicle.

25. Linear electric motor of claim 23, wherein said road has a portion of said road below said vehicle, and said vehicle has wheels rolling along said portion of said road below said vehicle.

26. Linear electric motor of claim 23, further comprising a cabin for said vehicle, and tilting means, connected to said cabin, for allowing tilting of said cabin during motion of said vehicle.

27. Linear electric motor of claim 23, wherein said vehicle has wheels compressedly secured to a road all of which is located above said vehicle, further comprising apparatus for the interface of said wheels and said road, said road being supported in a substantially fixed position with respect to the Earth by a support means, said apparatus being apparatus for achieving superior traction between said wheels and said road independently of the weight of said vehicle, and for minimizing oscillation of said wheel upon said road, said apparatus comprising:

said road having at least substantially vertical and concave sides;

a plurality of at least substantially horizontal wheels rotating about at least substantially vertical axles secured to said vehicle, said wheels having convex rims rolling along said concave sides of said road; and a compression means, connected to said wheels, for causing said wheels to be compressed against said sides of said road with compression adequate to allow a desired amount of traction to be maintained between said wheels and said road, independently of said weight of said vehicle.

28. Linear electric motor of claim 1, wherein, when the number of said motor part pairs that are powered simultaneously is n, where n is a positive integer, the number of said vehicle parts used for powering said motor parts one at a time is increased by a factor of n without changing said spacing of said motor parts used for powering said motor part pairs one at a time.

29. Linear electric motor of claim 1, wherein said source of pulsating electric current provides each said powerable electric coil of each said motor part pair with pulsating current having at least two current nulls, one for switching said pulsating electric current on to any said pair of motor parts when said pair of motor parts is in position to begin a desired forceful interaction between said motor parts of said pair, and another said null for switching said pulsating electric current off to said pair of motor parts when said vehicle has moved the distance over which said forceful interaction can be generated by said pair of motor parts.

30. Linear electric motor of claim 1, wherein said road parts are mounted on a portion of said road located above said vehicle.

31. Linear electric motor of claim 1, further comprising means, connected to said pulsating source of electric current and to said motor parts, for insuring continuous transmission of power to said motor.

32. Linear electric motor of claim 1, wherein said source of pulsating electric current is switched on to power any said powerable electric coil when said powerable electric coil is in position for achieving sufficient magnetic interaction between current flowing in said vehicle part and current in said road part, for generation of a desired electromagnetic force on said vehicle.

33. Linear electric motor of claim 1, wherein said source of pulsating electric current is stationary.

34. A linear electric motor for transportation of at least one vehicle along a road, of the type having motor parts which are both vehicle parts of said motor mounted on each said vehicle, and road parts of said motor mounted along said road, comprising:

a pulsating source of electric current, connected to said motor;

a switching means, connected to said motor and to said source of electric current, for switching said current on to those said motor parts that are powerable electric coils at suitable times and for suitable intervals; and a spacing and timing control means, for spacing of said motor parts and for controlling timing of said switching of said current to said motor, to perform the functions of allowing continuous transmission of power to said motor for both propulsion and braking of said vehicle, and minimizing the number of road parts required to be present along said road.

* * * * *